(12) United States Patent
Ueda et al.

(10) Patent No.: US 8,894,500 B2
(45) Date of Patent: Nov. 25, 2014

(54) DIAGNOSING METHOD OF GOLF SWING

(71) Applicants: Dunlop Sports Co. Ltd., Kobe-shi, Hyogo (JP); Sumitomo Rubber Industries, Ltd., Kobe-shi, Hyogo (JP); Yoshiaki Shirai, Toyonaka (JP); Nobutaka Shimada, Ibaraki (JP)

(72) Inventors: Masahiko Ueda, Kobe (JP); Yoshiaki Shirai, Toyonaka (JP); Nobutaka Shimada, Ibaraki (JP)

(73) Assignees: Dunlop Sports Co. Ltd., Kobe (JP); Sumitomo Rubber Industries, Ltd., Kobe (JP); Yoshiaki Shirai, Osaka (JP); Nobutaka Shimada, Osaka (JP)

( * ) Notice: Subject to any disclaimer, the term of this patent is extended or adjusted under 35 U.S.C. 154(b) by 28 days.

(21) Appl. No.: 13/709,950

(22) Filed: Dec. 10, 2012

(65) Prior Publication Data

US 2013/0172094 A1  Jul. 4, 2013

(30) Foreign Application Priority Data

Dec. 29, 2011  (JP) ................................. 2011-290298

(51) Int. Cl.
A63B 57/00 (2006.01)
A63B 69/36 (2006.01)
G06K 9/00 (2006.01)
G06T 7/20 (2006.01)
G09B 19/00 (2006.01)

(52) U.S. Cl.
CPC ............ *A63B 69/36* (2013.01); *G06K 9/00342* (2013.01); *G06T 7/2053* (2013.01); *G09B 19/0038* (2013.01); *G06T 2207/10016* (2013.01); *G06T 2207/30221* (2013.01)
USPC ............ 473/219; 473/131; 473/141; 473/156

(58) Field of Classification Search
None
See application file for complete search history.

(56) References Cited

U.S. PATENT DOCUMENTS

| 2005/0143183 | A1* | 6/2005 | Shirai et al. | 473/151 |
|---|---|---|---|---|
| 2005/0215337 | A1* | 9/2005 | Shirai et al. | 473/151 |
| 2008/0132339 | A1* | 6/2008 | Taira | 463/43 |
| 2011/0212791 | A1* | 9/2011 | Ueda et al. | 473/221 |

FOREIGN PATENT DOCUMENTS

| JP | 2011-78066 A | 4/2011 |
|---|---|---|
| JP | 2011-78069 A | 4/2011 |

* cited by examiner

*Primary Examiner* — Tramar Harper
(74) *Attorney, Agent, or Firm* — Birch, Stewart, Kolasch & Birch, LLP

(57) ABSTRACT

A camera 10 photographs a golf player swinging a golf club to hit a golf ball and the golf club. Image data is obtained by photographing. A calculating part 16 extracts a plurality of frames from the image data. The calculating part 16 determines a check frame in which the golf player is in a predetermined posture from the plurality of frames. The calculating part 16 determines a contour of the golf player from the check frame. The calculating part 16 decides a swing from the contour of the golf player. An extreme value constituting the contour is determined in deciding the swing. A feature point is determined from the extreme value. The swing is diagnosed using the feature point.

16 Claims, 46 Drawing Sheets

| A | B | C |
|---|---|---|
| D | E | F |
| G | H | I |

*FIG. 6*

DIAGNOSING METHOD OF GOLF SWING

The present application claims priority on Patent Application No. 2011-290298 filed in JAPAN on Dec. 29, 2011, the entire contents of which are hereby incorporated by reference.

BACKGROUND OF THE INVENTION

1. Field of the Invention

The present invention relates to a diagnosing method of quality of a golf swing.

2. Description of the Related Art

When a golf player hits a golf ball, the golf player addresses so that a line connecting right and left tiptoes is approximately parallel to a hitting direction. In a right-handed golf player's address, a left foot is located on a front side in the hitting direction, and a right foot is located on a back side in the hitting direction. In the address, a head of a golf club is located near the golf ball. The golf player starts a takeback from this state, and raises up the head backward and then upward. A position where the head is fully raised up is a top. A downswing is started from the top. A start point of the downswing is referred to as a quick turn. The head is swung down after the quick turn, and the head collides with the golf ball (impact). After the impact, the golf player swings through the golf club forward and then upward (follow-through), and reaches a finish.

In improvement in skill of a golf player, it is important to acquire a suitable swing form. Swing diagnosis is conducted so as to contribute to the improvement in the skill. In the swing diagnosis, a swing is photographed by a video camera. The swing may be photographed in order to collect materials useful for development of golf equipment.

In classic swing diagnosis, a teaching pro or the like views a moving image and points out problems during a swing. On the other hand, an attempt to diagnose the swing using image processing is also conducted. In the image processing, a frame required for diagnosis needs to be extracted from a large number of frames. It is necessary to extract a silhouette of a photographic subject from these frames. An example of a method for extracting the silhouette of the photographic subject is disclosed in Japanese Patent Application Laid-Open Nos. 2005-210666 (US2005/0143183) and 2011-78069.

In the method disclosed in Japanese Patent Application Laid-Open No. 2005-210666, the photographic subject and a background scene are distinguished by using difference processing. The silhouette of the photographic subject is extracted by the difference processing. In the method disclosed in Japanese Patent Application Laid-Open No. 2011-78069, the photographic subject and the background scene are distinguished by using a silhouette extracting method. In the silhouette extracting method, the silhouette of the photographic subject is extracted by using a luminance histogram and a color histogram of a pixel constituting the frame.

For example, a predetermined silhouette such as a silhouette of an address is specified from the plurality of extracted silhouettes. The quality of the swing is decided from the specified silhouette. Quality judgement can be automated by extracting suitable information from the silhouette. When the extracted information is suitable, the quality of the swing can be accurately decided.

It is an object of the present invention to provide a method capable of readily and accurately diagnosing quality of a swing.

SUMMARY OF THE INVENTION

A diagnosing method of a golf swing according to the present invention includes the steps of:

a camera photographing a golf player swinging a golf club to hit a golf ball and the golf club to obtain image data;

obtaining a plurality of frames from the image data and determining a check frame in which the golf player is in a predetermined posture from the plurality of frames;

determining a contour of the golf player from the check frame; and deciding the swing from the contour of the golf player.

An extreme value constituting the contour is determined in the step of deciding the swing; a feature point is determined from the extreme value; and the swing is diagnosed using the feature point.

Preferably, in the diagnosing method, the extreme value constitutes a contour of a head part, a contour of a waist, or a contour of a heel.

Preferably, in the diagnosing method, two or more extreme values or reference points obtained from the extreme values are determined. A point on the contour is the feature point, wherein a distance between a straight line passing through the two reference points and the point on the contour is maximized or minimized.

Preferably, in the diagnosing method, two or more extreme values or reference points obtained from the extreme values are determined. A point on the contour is determined to be a control point of a Bezier curve, wherein a distance between a straight line passing through the two reference points and the point on the contour is maximized or minimized. The contour is approximated with the Bezier curve. Still another feature point is determined based on the Bezier curve when the contour is most approximated.

Preferably, in the diagnosing method, the point on the contour is determined as a reference point based on the extreme value; the contour including the reference point is subjected to polynomial approximation to obtain an approximate line; and a point on the approximate line as the extreme value is still another feature point.

Preferably, in the diagnosing method, a part of the contour of which a relative position from the feature point is specified as a template. The template is matched with another region of the contour. When the template is most approximated to another region of the contour, a point of a position corresponding to the feature point specified from the template is still another feature point.

Preferably, in the diagnosing method, a point on a straight line extended from the another feature point and having a maximum edge is still another feature point.

Preferably, in the diagnosing method, a point determined based on a geometrical position relation of a region of a human body from the extreme value, a reference point obtained from the extreme value, or the feature point is still another feature point.

Preferably, in the diagnosing method, the geometrical position relation of the region of the human body is a position relation in the check frame in which the golf player is in the predetermined posture.

Preferably, in the diagnosing method, a predetermined search area on the basis of the extreme value, a reference point obtained from the extreme value, or the feature point is set. A point which is the extreme value in the search area is still another feature point.

Preferably, in the diagnosing method, the predetermined search area is set based on a geometrical position relation between the extreme value, the reference point, or the feature point and the region of the human body.

Preferably, the geometrical position relation of the region of the human body is a position relation in the check frame in which the golf player is in the predetermined posture.

Preferably, a binary image of a silhouette of the golf player is obtained from the check frame in the step of determining the contour of the golf player from the check frame. The contour of the golf player is determined from the binary image.

Preferably, a difference image is obtained by subjecting the plurality of frames to difference processing in the step of determining the contour of the golf player from the check frame. The contour of the golf player is determined from the difference image.

Preferably, the diagnosing method further includes the step of conducting camera shake correction, and the plurality of frames obtained from the image data are subjected to the camera shake correction.

Preferably, the image data is subjected to the camera shake correction in the step of conducting the camera shake correction.

A diagnosing system of a golf swing according to the present invention includes:

(A) a camera photographing a golf player swinging a golf club to hit a golf ball and the golf club;

(B) a memory storing photographed image data; and (C) a calculating part. The calculating part includes:

(C1) a function for extract a plurality of frames from the image data;

(C2) a function for determining a check frame in which the golf player is in a predetermined posture from the plurality of frames;

(C3) a function for determining a contour of the golf player of the check frame;

(C4) a function for determining an extreme value from the contour;

(C5) a function for determining a feature point from the extreme value; and (C6) a function for diagnosing the swing using position information of the feature point.

Preferably, the calculating part of the diagnosing system has a function for subjecting the image data to camera shake correction.

In the method according to the present invention, the extreme value is determined from the contour. The feature point is determined from the extreme value. The quality of the golf swing is diagnosed using the position information of the feature point. The quality of the golf swing can be readily and accurately diagnosed by using the extreme value and the feature point.

BRIEF DESCRIPTION OF THE DRAWINGS

FIG. 6 is an illustration for a Sobel method;

DESCRIPTION OF THE PREFERRED EMBODIMENTS

Hereinafter, the present invention will be described below in detail based on preferred embodiments with reference to the drawings.

Figure 1:
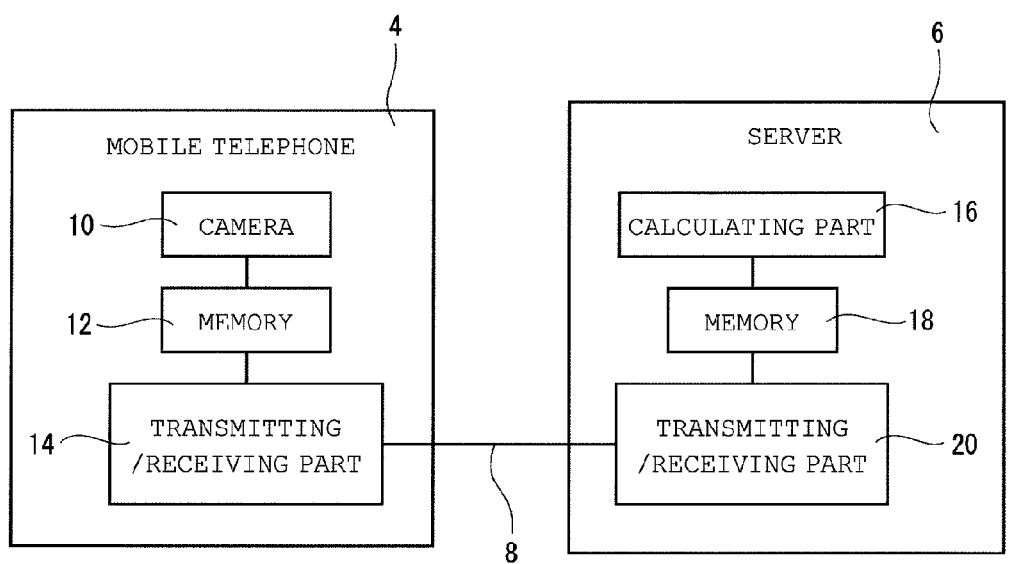
FIG. 1 is a conceptual view showing a swing diagnosing system according to one embodiment of the present invention.

A diagnosing system 2 shown in FIG. 1 is provided with a mobile telephone 4 and a server 6. The mobile telephone 4 and the server 6 are connected each other via a communication line 8. The mobile telephone 4 is provided with a camera 10, a memory 12, and a transmitting/receiving part 14. Specific examples of the memory 12 include a RAM, an SD card (including a mini SD and a micro SD or the like), and other memory medium. The server 6 is provided with a calculating part 16, a memory 18, and a transmitting/receiving part 20. The calculating part 16 is typically a CPU.

Figure 2:
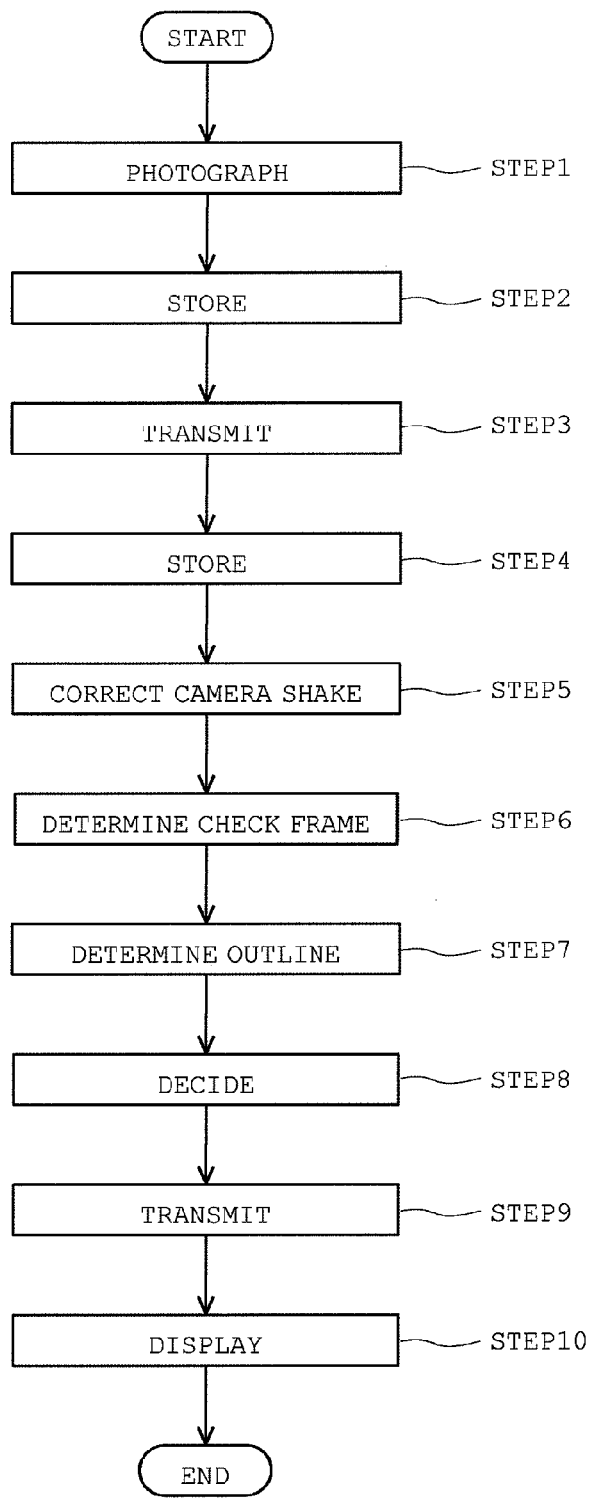
FIG. 2 is a flow chart showing a diagnosing method of a golf swing conducted by the system of FIG. 1.
Figure 3:
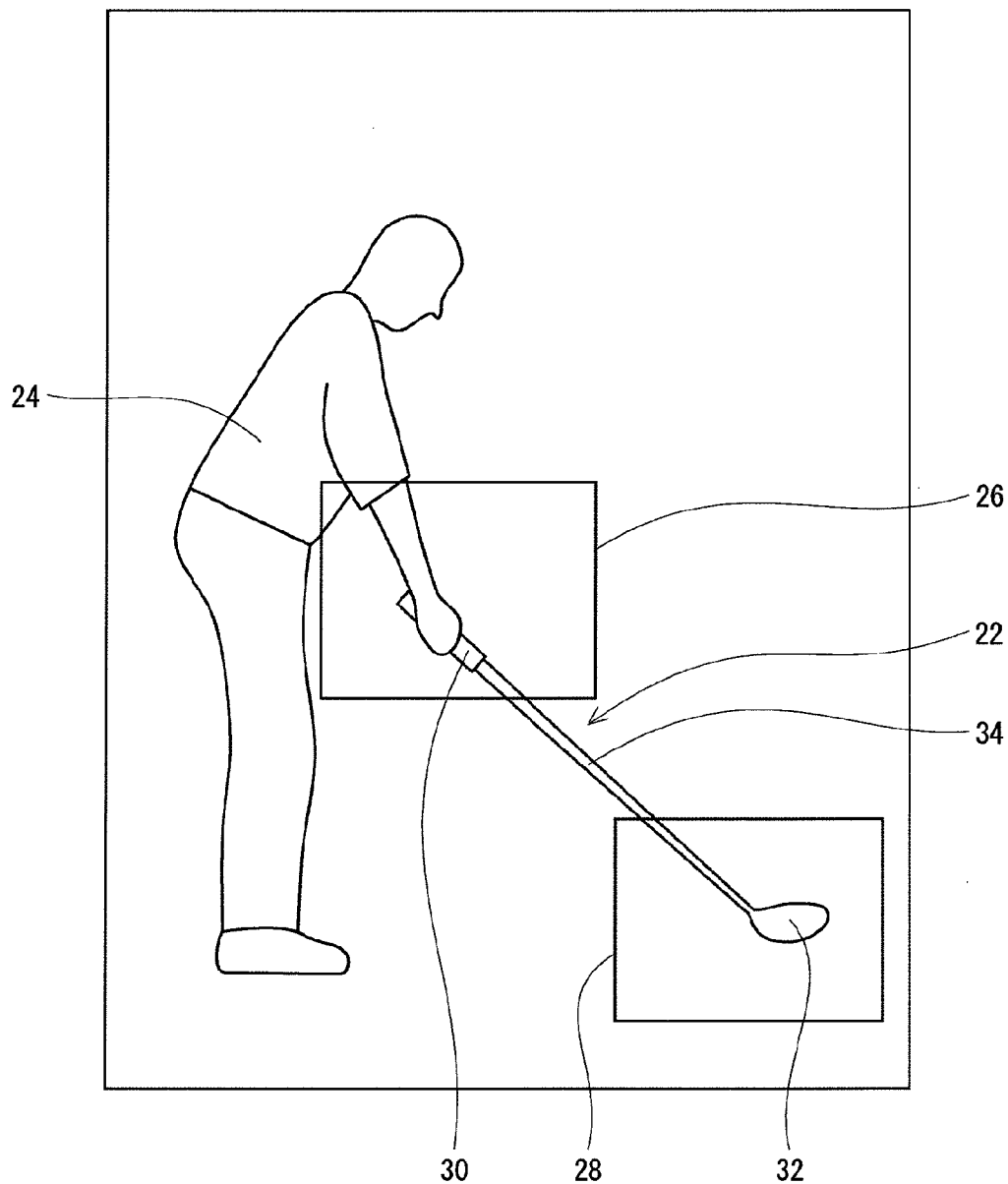
FIG. 3 is an illustration showing a screen of a camera of FIG. 1.

A flow chart of diagnosing method of a golf swing conducted by the system 2 of FIG. 1 is shown in FIG. 2. In the diagnosing method, photographing is conducted by the camera 10 (STEP1). A screen before photographing is started is shown in FIG. 3. The screen is displayed on a monitor (not shown) of the mobile telephone 4. An address of a golf player 24 having a golf club 22 is photographed on the screen. On the screen, the golf player 24 is photographed from a back side. A first frame 26 and a second frame 28 are shown on the screen. These frames 26 and 28 are displayed by software executed on a CPU (not shown) of the mobile telephone 4. The frames 26 and 28 contribute to a case where a photographer determines an angle of the camera 10. The photographer determines an angle of the camera 10 so that the first frame 26 includes a grip 30 and the second frame 28 includes a head 32. Furthermore, the frames 26 and 28 contribute to determination of a distance between the camera 10 and the golf player 24.

Photographing is started from the state shown in FIG. 3. After the photographing is started, the golf player 24 starts a swing. The photographing is continued until a golf ball (not shown) is hit and the swing is ended. Moving image data is obtained by the photographing. The data includes a large number of frames. These frames are stored in the memory 12 (STEP2). The number of pixels of each of the frames is, for example, 640×480. Each of the pixels has RGB system color information.

The photographer or the golf player 24 operates the mobile telephone 4 to transmit the moving image data to the server 6 (STEP3). The data is transmitted to the transmitting/receiving part 20 of the server 6 from the transmitting/receiving part 14 of the mobile telephone 4. The transmission is conducted via the communication line 8. The data is stored in the memory 18 of the server 6 (STEP4).

The calculating part 16 conducts camera shake correction (STEP5). As described later, the diagnosing method according to the present invention conducts difference processing between the frames. The camera shake correction enhances the accuracy in the difference processing. A feature point is diverted between the frames. The camera shake correction increases the accuracy of the position of the feature point. An example of a method for the camera shake correction is disclosed in Japanese Patent Application No. 2011-78066. When the mobile telephone 4 has a sufficient camera shake correction function, the camera shake correction conducted by the calculating part 16 can be omitted.

The calculating part 16 determines a frame presented in order to decide quality of a swing from a large number of frames (STEP6). Hereinafter, the frame is referred to as a check frame. For example, frames corresponding to the following items (1) to (6) are extracted:
(1) an address
(2) a predetermined position during a takeback
(3) a top
(4) a quick turn
(5) an impact
(6) a finish The predetermined position during the takeback includes a position where an arm is horizontal. The quick turn implies a state immediately after start of the downswing. In the quick turn, the arm is substantially horizontal. The details of an extracting step (STEP6) of the check frame will be described later.

The calculating part 16 determines a contour of a photographic subject in each of the check frames (STEP7). Specifically, the calculating part 16 determines a contour of a body of the golf player 24 or the contour of the body of the golf player 24 and a contour of the golf club 22. The calculating part 16 decides the quality of the swing based on the contour (STEP8).

The deciding result is transmitted to the transmitting/receiving part 14 of the mobile telephone 4 from the transmitting/receiving part 20 of the server 6 (STEP9). The deciding result is displayed on the monitor of the mobile telephone 4 (STEP10). The golf player 24 viewing the monitor can know a portion of the swing which should be corrected. The system 2 can contribute to improvement in skill of the golf player 24.

As described above, the calculating part 16 determines the check frame (STEP6). The calculating part 16 has the following functions:

(1) a function for obtaining an edge image of a frame extracted from the image data;

(2) a function for subjecting the edge image to binarization based on a predetermined threshold value to obtain a binary image;

(3) a function for subjecting the binary image to Hough transform processing to extract a position of a shaft of the golf club 22, and specifying a tip coordinate of the golf club 22;

(4) a function for contrasting tip coordinates of different frames to determine a temporary flame in the address;

(5) a function for calculating color information in the reference area of each of frames by backward sending from a frame after the temporary frame by a predetermined number, and determining a frame in the address based on change of the color information;

(6) a function for using a frame after the frame in the address by a predetermined number as a reference frame, calculating a difference value between each of frames after the reference frame and the reference frame, and determining a frame of an impact based on change of the difference value;

(7) a function for calculating a difference value between each of a plurality of frames before the frame of the impact and a previous frame thereof, and determining a frame of a top based on the difference value;

(8) a function for calculating a difference value between each of a plurality of frames after the frame of the address and the frame of the address;

(9) a function for subjecting the difference value of each of the frames to Hough transform processing to extract the position of the shaft; and

(10) a function for determining a frame of a predetermined position during a takeback based on the change of the position of the shaft.

Figure 4:
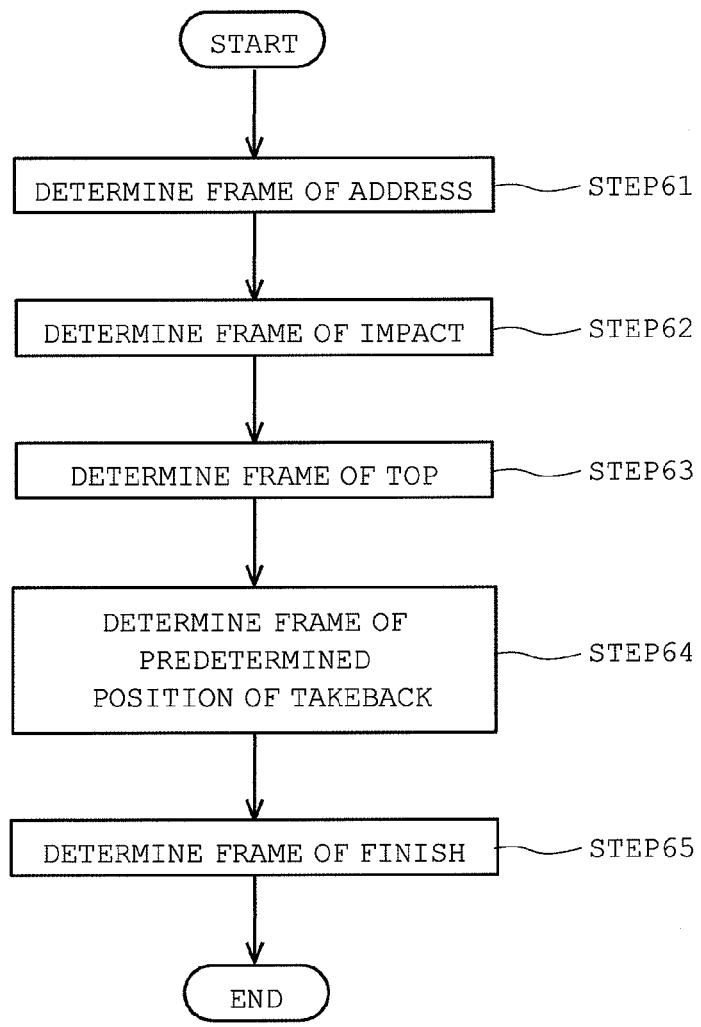
FIG. 4 is a flow chart showing a determining method of a check frame.

A flow chart of a determining method of the check frame is shown in FIG. 4. The determining method includes a step of determining the frame of the address (STEP61), a step of determining the frame of the impact (STEP62), a step of determining the frame of the top (STEP63), a step of determining the frame of the predetermined position of the takeback (STEP64), and a step of determining the frame of the finish (STEP65). The predetermined position of the takeback is, for example, a position where the arm is horizontal. The step of determining the frame of the finish (STEP65) may be omitted.

The step of determining the frame of the finish (STEP65) can determine a frame after the frame of the impact by a predetermined number as the frame of the finish, for example. The step of determining the frame of the finish (STEP65) may be the same as the step of determining the frame of the top (STEP63).

Other check frame may be determined based on the frame determined by the method shown in FIG. 4. For example, a frame before the frame of the impact by a predetermined number can be defined as a frame of a quick turn.

Figure 5:
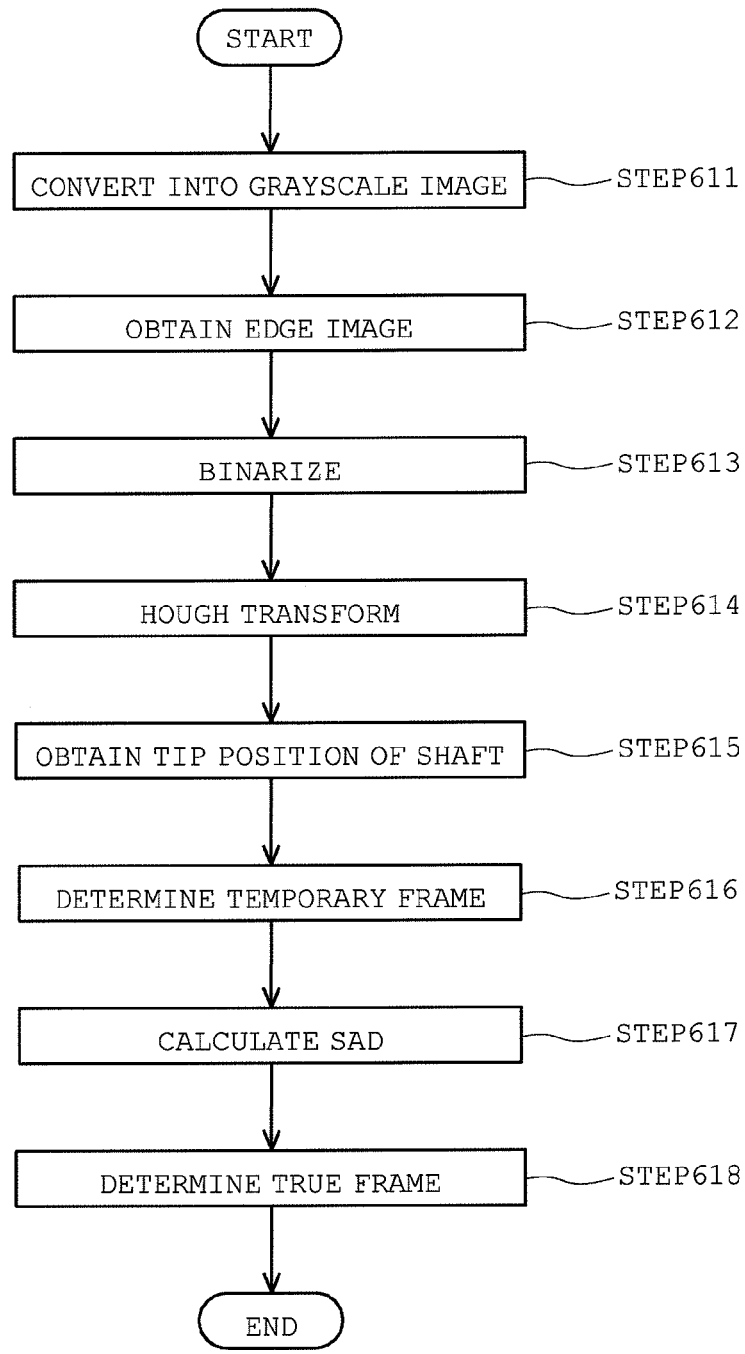
FIG. 5 is a flow chart showing a method determining a frame of an address.

A flow chart of a method for determining the frame of the address is shown in FIG. 5. In the method, each of the frames is converted into a grayscale image from an RGB image (STEP611). The conversion is conducted in order to facilitate subsequent edge detection. A value V in the grayscale image is calculated by, for example, the following numerical expression.

$$V = 0.30 \cdot R + 0.59 \cdot G + 0.11 \cdot B$$

The edge is detected from the grayscale image and the edge image is obtained (STEP612). In the edge, change of a value V is great. Therefore, the edge can be detected by differentiating or taking differences of the change of the value V. A noise is preferably removed in the calculation of the differentiation or the difference. A Sobel method is exemplified as an example of the method for detecting the edge. The edge may be detected by other method. A Prewitt method is exemplified as the other method.

Figure 6:
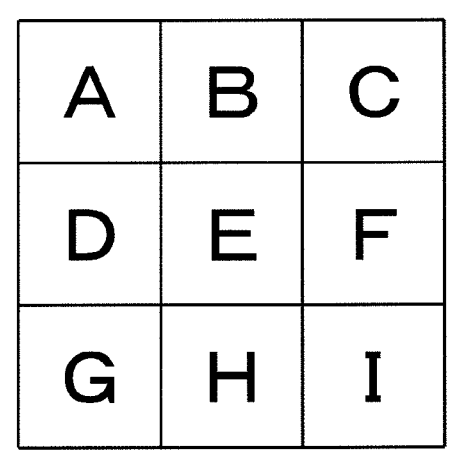

FIG. 6 is an illustration for the Sobel method. Characters A to I in FIG. 6 represent values V of the pixels. A value E' is calculated from a value E by the Sobel method. The value E' is edge intensity. The value E' is obtained by the following numerical expression.

$$E' = (f_x^2 + f_y^2)^{1/2}$$

In the numerical expression, $f_x$ and $f_y$ are obtained by the following numerical expression.

$$f_x = C + 2 \cdot F + I - (A + 2 \cdot D + G)$$

$$f_y = G + 2 \cdot H + I - (A + 2 \cdot B + C)$$

Figure 7:
FIG. 7 is a binarized image.

Each of the pixels of the edge image is binarized (STEP613). A threshold value for binarization is suitably determined according to the weather and the time or the like. A monochrome image is obtained by the binarization. An example of the monochrome image is shown in FIG. 7.

Data of the monochrome image is presented for Hough transform (STEP614). The Hough transform is a method for extracting a line from an image using regularity of a geometric shape. A straight line, a circle, and an ellipse or the like can be extracted by the Hough transform. In the invention, a straight line corresponding to the shaft of the golf club 22 is extracted by the Hough transform.

The straight line can be represented by an angle θ between a line perpendicular to the straight line and an x-axis, and a distance ρ between the straight line and a origin point. The angle θ is a clockwise angle having a center on the origin point (0, 0). The origin point is on the upper left. The straight line on an x-y plane corresponds to a point on a θ-ρ plane. On the other hand, a point $(x_i, y_i)$ on the x-y plane is converted into a sine curve represented by the following numerical expression on the θ-ρ plane.

$$\rho = x_i \cdot \cos \theta + y_i \cdot \sin \theta$$

When points which are on the same straight line on the x-y plane are converted into the θ-ρ plane, all sine curves cross at one point. When a point through which a large number of sine curves pass in the θ-ρ plane becomes clear, the straight line on the x-y plane corresponding to the point becomes clear.

Extraction of a straight line corresponding to the shaft is attempted by the Hough transform. In a frame in which the shaft is horizontal in the takeback, an axis direction of the shaft approximately coincides with an optical axis of the camera 10. In the frame, the straight line corresponding to the shaft cannot be extracted. In the embodiment, ρ is not specified; θ is specified as 30 degrees or greater and 60 degrees or less; x is specified as 200 or greater and 480 or less; and y is specified as 250 or greater and 530 or less. Thereby, the extraction of the straight line is attempted. Since θ is specified as the range, a straight line corresponding to an erected pole is not extracted. A straight line corresponding to an object placed on the ground and extending in a horizontal direction is also not extracted. False recognition of a straight line which does not correspond to the shaft as the straight line corresponding to the shaft is prevented by specifying θ as 30 degrees or greater and 60 degrees or less. In the embodiment, in straight lines in which the number of votes (the number of pixels through which one straight line passes) is equal to or greater than 150, a straight line having the greatest number of votes is regarded as the straight line corresponding to the shaft. In the frame in which the straight line corresponding to the shaft is extracted by the Hough transform, the tip coordinate of the shaft (the tip position of the straight line) is obtained (STEP615).

In the embodiment, the tip coordinate is obtained by backward sending from a 50th frame after the photographing is started. A frame in which the moving distance of the tip between the frame and both the preceding and following frames is equal to or less than a predetermined value is determined as a temporary frame of the address (STEP616). In the embodiment, a f-th frame in which a tip is in the second frame 28 (see FIG. 4) and the summation of the moving distances of (f−1)th to (f+2) th tips is equal to or less than 40 is defined as a temporary frame.

SAD (color information) of a plurality of frames before and after the temporary frame is calculated (STEP617). SAD is calculated by the following numerical expression (1).

$$SAD = (RSAD + GSAD + BSAD)/3 \quad (1)$$

In the numerical expression (1), RSAD is calculated by the following numerical expression (2); GSAD is calculated by the following numerical expression (3); and BSAD is calculated by the following numerical expression (4).

$$RSAD = (Rf1 - Rf2)^2 \quad (2)$$

$$GSAD = (Gf1 - Gf2)^2 \quad (3)$$

$$BSAD = (Bf1 - Bf2)^2 \quad (4)$$

In the numerical expression (2), Rf1 represents an R value in the f-th second frame 28; Rf2 represents an R value in the (f+1)-th second frame 28. In the numerical expression (3), Gf1 represents a G value in the f-th second frame 28; and Gf2 represents a G value in the (f+1)-th second frame 28. In the numerical expression (4), Bf1 represents a B value in the f-th second frame 28; and Bf2 represents a B value in the (f+1)-th second frame 28.

SAD of each of the frames is calculated by backward sending from a frame after the temporary frame by a predetermined number. In the embodiment, SAD of a frame after the temporary frame by 7 to a frame before the temporary frame by 10 is calculated. A frame in which SAD is first less than 50 is determined as a true frame of the address (STEP618). The frame is the check frame. When the frame in which SAD is less than 50 does not exist, a frame in which SAD is the minimum is determined as the true frame of the address.

Figure 8:
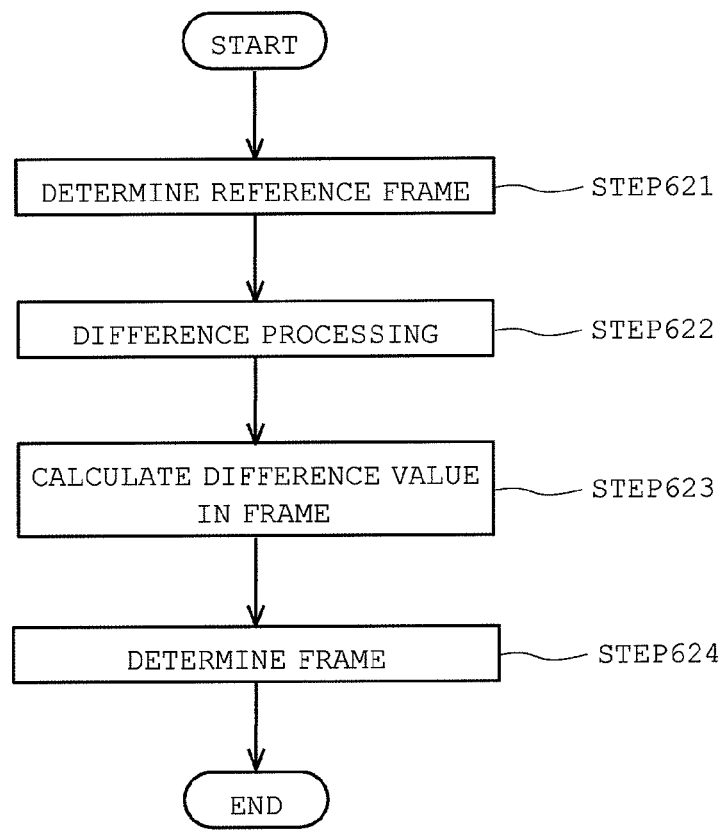
FIG. 8 is a flow chart showing a method determining a frame of an impact.

A flow chart of a method for determining the frame of the impact is shown in FIG. 8. Since the frame of the address has been already determined, the frame after the frame of the address by the predetermined number is determined as a reference frame (STEP621). The reference frame is a frame before the impact in which the golf club 22 is not reflected in the second frame 28. In the embodiment, a frame after the frame of the address by 25 is defined as the reference frame.

Difference processing is conducted between the reference frame and each of the frames after the reference frame (STEP622). The difference processing is processing known as one of image processings. Difference images are shown in FIGS. 9A to 9F. The details of the images are as follows.

Figure 9A:
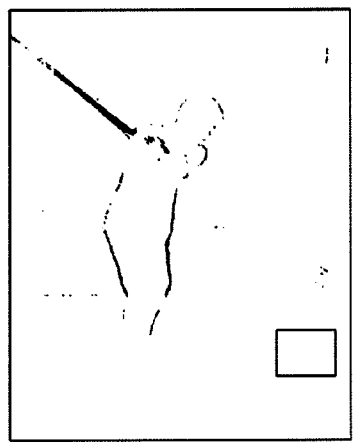
FIG. 9A is an image showing a result of a difference between a 44th frame and a reference frame.

FIG. 9A: A difference image between a 44th frame and the reference frame

Figure 9D:
FIG. 9D is an image showing a result of a difference between a 76th frame and the reference frame.
Figure 9B:
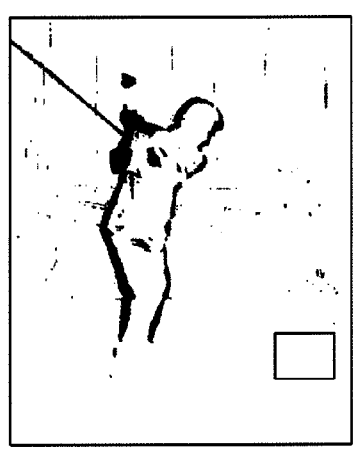
FIG. 9B is an image showing a result of a difference between a 62th frame and the reference frame.

FIG. 9B: A difference image between a 62th frame and the reference frame

Figure 9E:
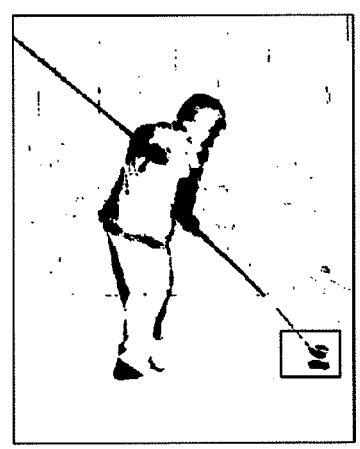
FIG. 9E is an image showing a result of a difference between a 77th frame and the reference frame.
Figure 9C:
FIG. 9C is an image showing a result of a difference between a 75th frame and the reference frame.

FIG. 9C: A difference image between a 75th frame and the reference frame

FIG. 9D: A difference image between a 76th frame and the reference frame

FIG. 9E: A difference image between a 77th frame and the reference frame

Figure 9F:
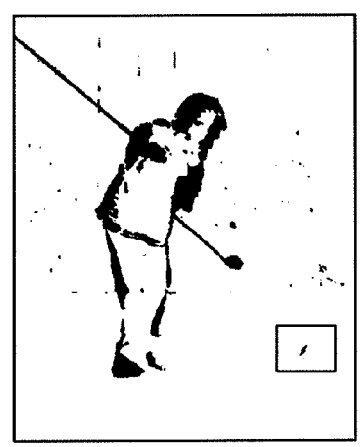
FIG. 9F is an image showing a result of a difference between a 78th frame and the reference frame.

FIG. 9F: A difference image between a 78th frame and the reference frame

Figure 10:
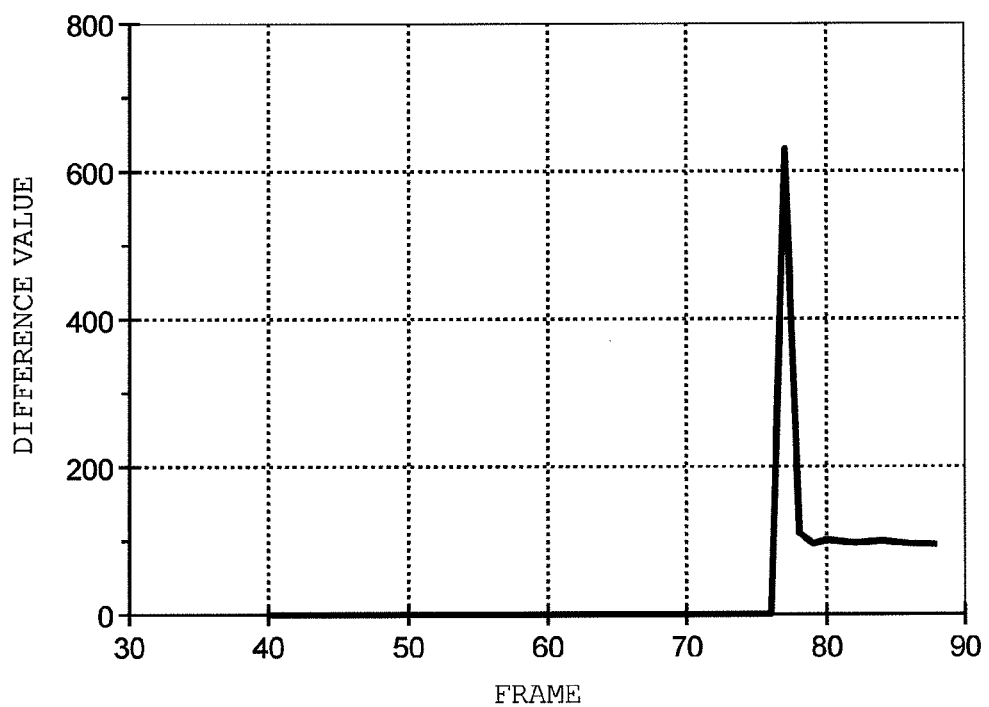
FIG. 10 is a graph showing a difference value.

A difference value in the second frame 28 for the image after the difference processing is calculated (STEP623). The difference value is shown in a graph of FIG. 10. The graph shows that the difference value of the 77th frame is the largest. The 77th frame is determined as the frame of the impact (STEP624). The frame is the check frame.

Figure 11:
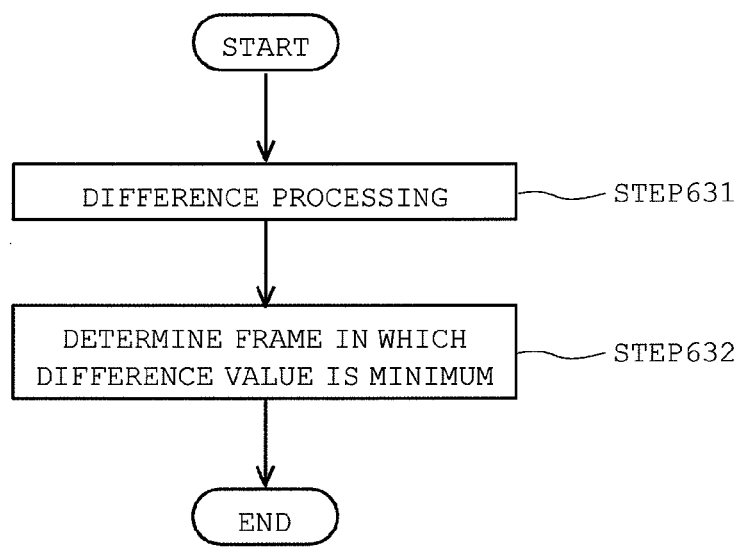
FIG. 11 is a flow chart showing a method determining a frame of a top.
Figure 12:
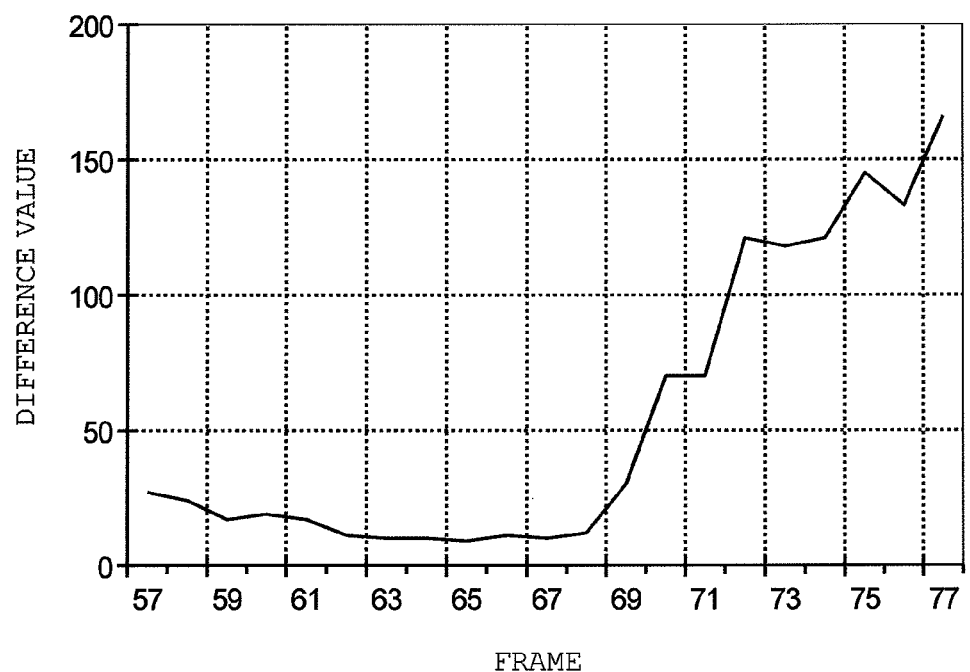
FIG. 12 is a graph showing a difference value.

A flow chart of a method for determining the frame of the top is shown in FIG. 11. The frame of the impact has been already determined. Difference processing of from the frame of the impact to a frame before the impact by a predetermined number is conducted (STEP631). The difference processing is conducted between the frame and a frame after the frame by 1. A difference value is obtained by the difference processing. The difference value is shown in FIG. 12. In the embodiment, a frame in which a difference value is the minimum is selected between a frame before the impact by 15 and the frame of the impact (STEP632). In the example of FIG. 12, the 77th frame is the frame of the impact; and a 65th frame is the frame of the top. The 65th frame is the check frame.

Figure 13:
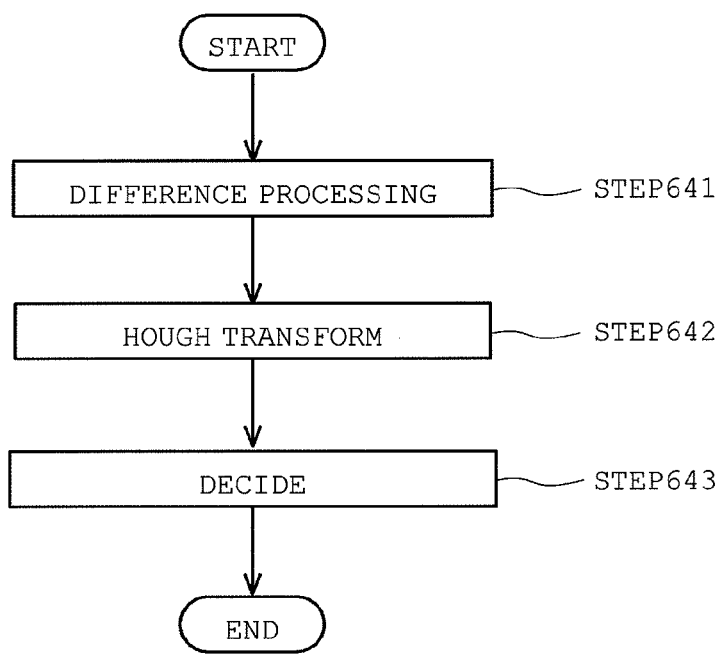
FIG. 13 is a flow chart showing a method determining a frame of a predetermined position of a takeback.

A flow chart of a method for determining the predetermined position of the takeback is shown in FIG. 13. The frame of the address has been already determined. The difference processing of frames after the frame of the address is conducted (STEP641). The frame of the address is used as the reference frame, and the difference processing is conducted between the reference frame and other frame. Difference images are shown in FIGS. 14A to 14F. The details of the images are as follows.

Figure 14A:
FIG. 14A is an image showing a result of a difference between a 30th frame and the reference frame.

FIG. 14A: A difference image between a 30th frame and the reference frame

Figure 14B:
FIG. 14B is an image showing a result of a difference between a 39th frame and the reference frame.

FIG. 14B: A difference image between a 39th frame and the reference frame

Figure 14C:
FIG. 14C is an image showing a result of a difference between a 41th frame and the reference frame.

FIG. 14C: A difference image between a 41th frame and the reference frame

Figure 14D:
FIG. 14D is an image showing a result of a difference between a 43th frame and the reference frame.

FIG. 14D: A difference image between a 43th frame and the reference frame

Figure 14E:
FIG. 14E is an image showing a result of a difference between a 52th frame and the reference frame.

FIG. 14E: A difference image between a 52th frame and the reference frame

Figure 14F:
FIG. 14F is an image showing a result of a difference between a 57th frame and the reference frame.

FIG. 14F: A difference image between a 57th frame and the reference frame

In these difference images, the number of pixels of a longitudinal y is 640, and the number of pixels of a transversal x is 480. These difference images are subjected to Hough transform (STEP642). A straight line corresponding to the shaft can be calculated by the Hough transform. In each of difference screens, the existence or nonexistence of the straight line satisfying the following conditions is decided (STEP643).

θ: 5 degrees or greater and 85 degrees or less
ρ: no specification
x: 0 or greater and 240 or less
y: 0 or greater and 320 or less
number of votes: equal to or greater than 100

In the frame from which the straight line satisfying these conditions is extracted, the shaft is located on a left side than a waist of the golf player 24. A frame (hereinafter, referred to as a "matching frame") after the frame of the address, from which the straight line satisfying these conditions is extracted first, is the check frame. A frame after the matching frame by a predetermined number may be determined as the check frame. In a frame after the matching frame by 2, it has been clear experientially that a left arm of the right-handed golf player 24 is almost horizontal.

Figure 15:
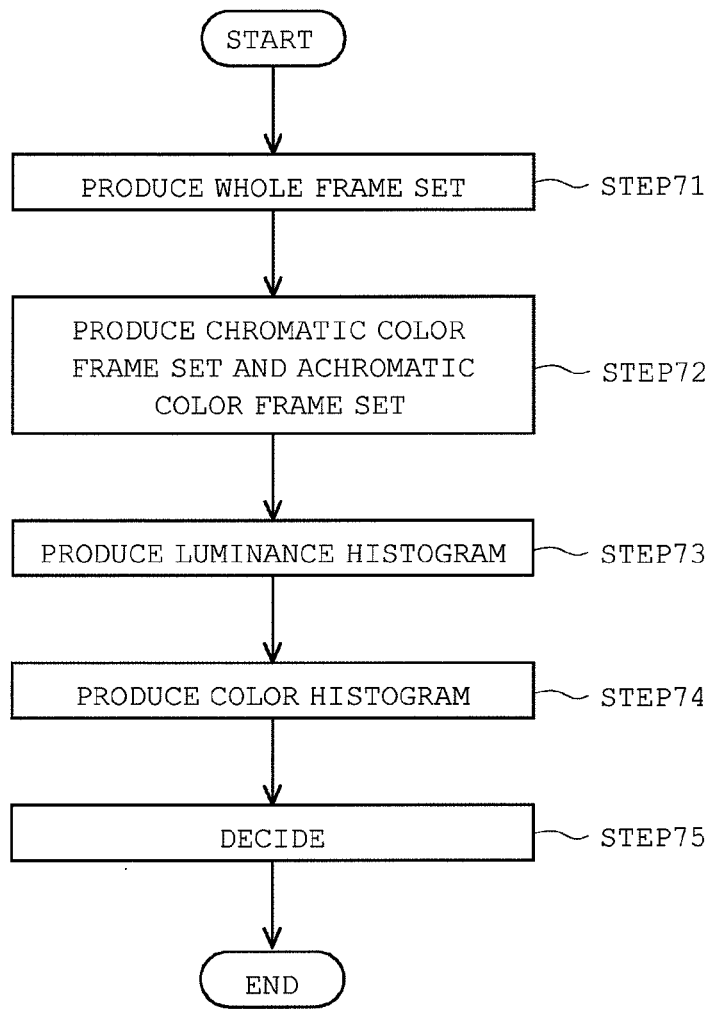
FIG. 15 is a flow chart showing a method in which a contour is determined by silhouette extraction.

The calculating part 16 determines the contour from the check frame (STEP7). A flow chart for determining the contour from the check frame is shown in FIG. 15. The calculating part 16 produces a whole frame set including all the frames for each of the pixels (STEP71). The calculating part 16 determines whether each of the pixels of each of the frames has an achromatic color or a chromatic color, and produces a chromatic color frame set and an achromatic color frame set for each of the pixels (STEP72).

The calculating part 16 produces a luminance histogram (a first histogram) for the whole frame set (STEP73). In the luminance histogram, a frequency is a frame number and a class is luminance (first color information). The luminance histogram may be produced based on another color information. The calculating part 16 produces a color histogram (a second histogram) for the chromatic color frame set and the achromatic color frame set (STEP74). In the color histogram, a frequency is a frame number; a class for the chromatic color frame set is hue (second color information); and a class for the achromatic color frame set is luminance (third color information). The class for the chromatic color frame set may be color information other than hue. The class for the achromatic color frame set may be color information other than luminance.

The calculating part 16 decides whether each of the frames of each of the pixels is a background scene or a photographic subject based on the luminance histogram and the color histogram (STEP75). Hereinafter, examples of main steps will be described in detail.

Figure 16:
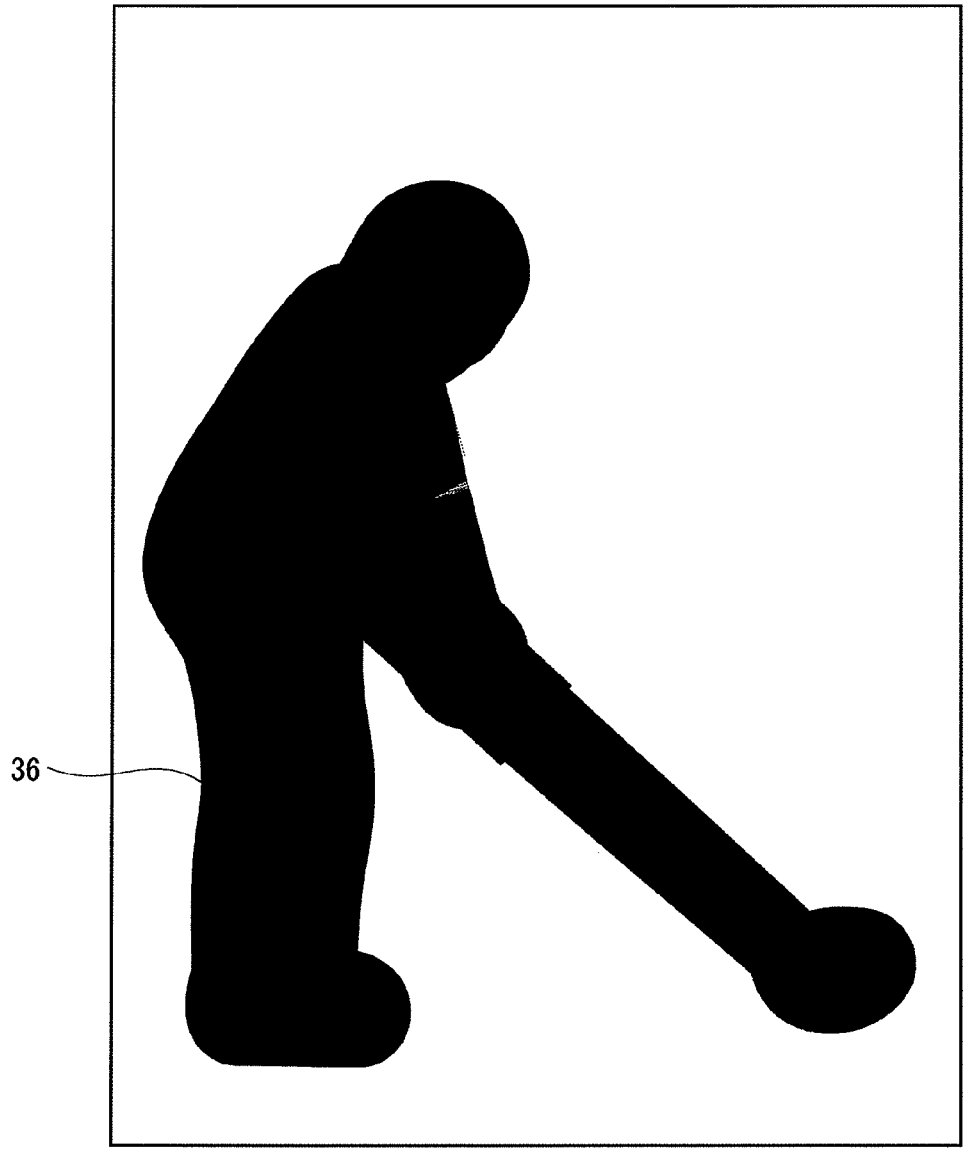
FIG. 16 is an illustration for showing a mask for the silhouette extraction of FIG. 15.

In the embodiment, a mask 36 shown in FIG. 16 is set in the first frame. As is apparent from FIG. 16, the mask 36 includes the golf player 24 and the golf club 22 shown in FIG. 3. An outer edge of the mask 36 is outside an outer edge of the golf player 24, and is outside an outer edge of the golf club 22. In determining whether each of the pixels has an achromatic color or a chromatic color, a pixel included in the mask 36 is not the object of calculation.

Figure 17:
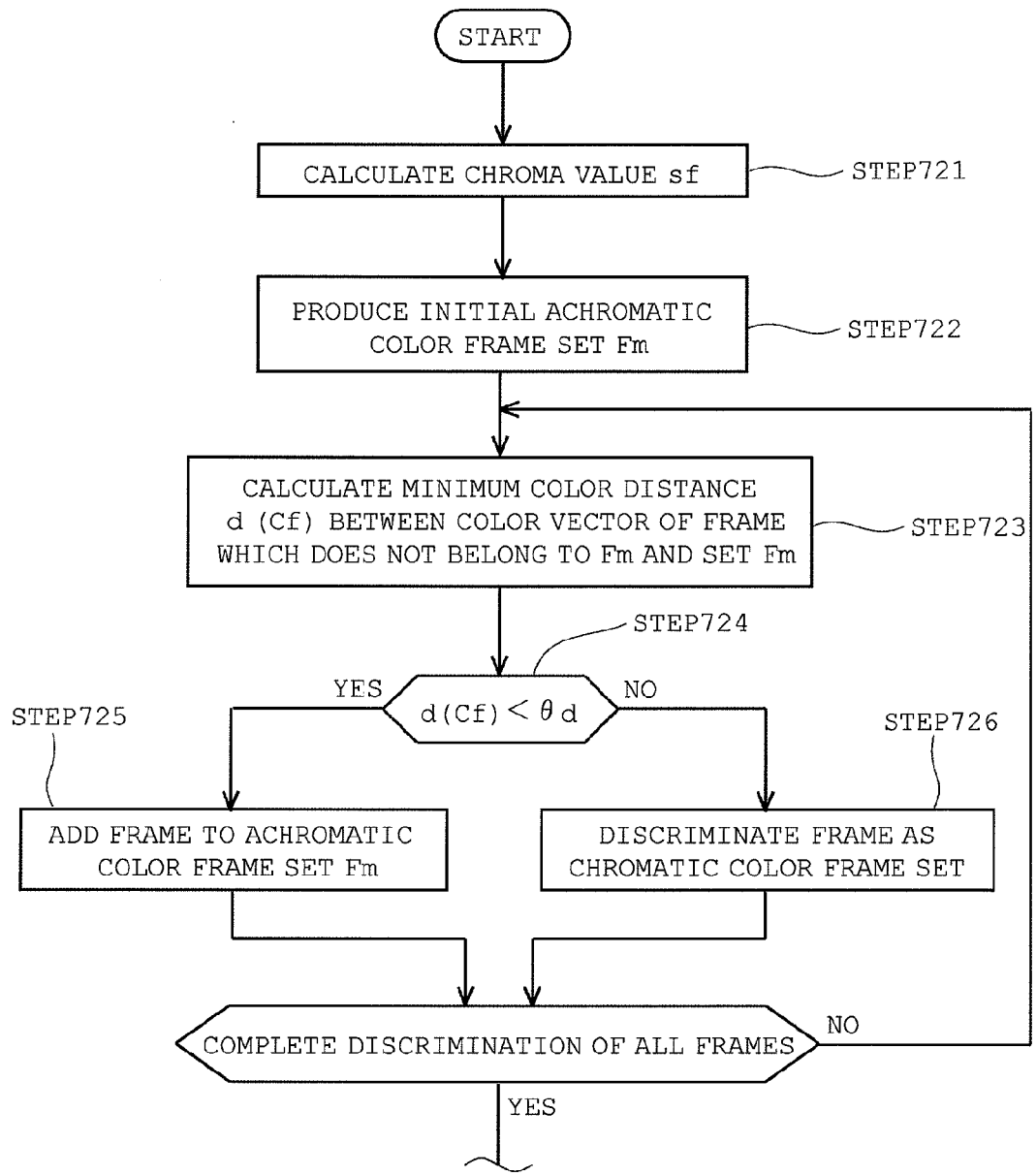
FIG. 17 is a flow chart showing the details of some steps of the silhouette extraction of FIG. 15.

In a flow chart of FIG. 17, the details of a step (STEP72) of determining whether each of the pixels has an achromatic color or a chromatic color, and producing an achromatic color frame set and a chromatic color frame set for each of the pixels are shown.

In the method, a chroma value sf of a pixel is calculated (STEP721). For example, when a silhouette is extracted based on sixty frames of the first frame to the 60th frame, the number of luminance values sf per one pixel is 60.

It is decided whether each of the sixty luminance values sf is smaller than a threshold value θs. The threshold value θs can be suitably determined. The threshold value θs used by the present inventor is 0.15. In other words, a color of a pixel in which a luminance value sf is less than 0.15 is regarded as an achromatic color or a substantial achromatic color. An initial achromatic color frame set Fm is obtained by the frame in which the luminance value sf is smaller than the threshold value θs (STEP722).

A minimum color distance d (Cf) between a color vector Cf of a pixel in a frame f which does not belong to the achromatic color frame set Fm and the set Fm is calculated (STEP723). The calculation is conducted based on the following numerical expression.

$$d(c_f) = \min_{n \in F^M} \left( \sqrt{(c_f - c_n)(c_f - c_n)^T} \right)$$

n when a color distance between the frame f and n is the minimum in the achromatic color frame set Fm is searched based on the numerical expression.

It is decided whether the obtained d (Cf) is less than a threshold value θd (STEP724). The threshold value θd can be suitably determined. The threshold value θd used by the present inventor is 3.0. In other words, a color of a pixel in which d (Cf) is less than 3.0 is regarded as an achromatic color or a substantial achromatic color. When d (Cf) is less than the threshold value θd, the frame is added to the achromatic color frame set Fm (STEP725). The achromatic color frame set Fm is updated by the addition. When d (Cf) is equal to or greater than the threshold value θd, the frame is discriminated as the chromatic color frame set (STEP726). The flow is repeated until the discrimination of all the frames as the chromatic color and the achromatic color is completed.

The flow shown in FIG. 17 is conducted for all the pixels except the mask 36. For example, when the number of the pixels except the mask 36 is 150000, and the number of the frames is 60, luminance values sf of 9000000 (150000×60) are calculated.

Figure 18:
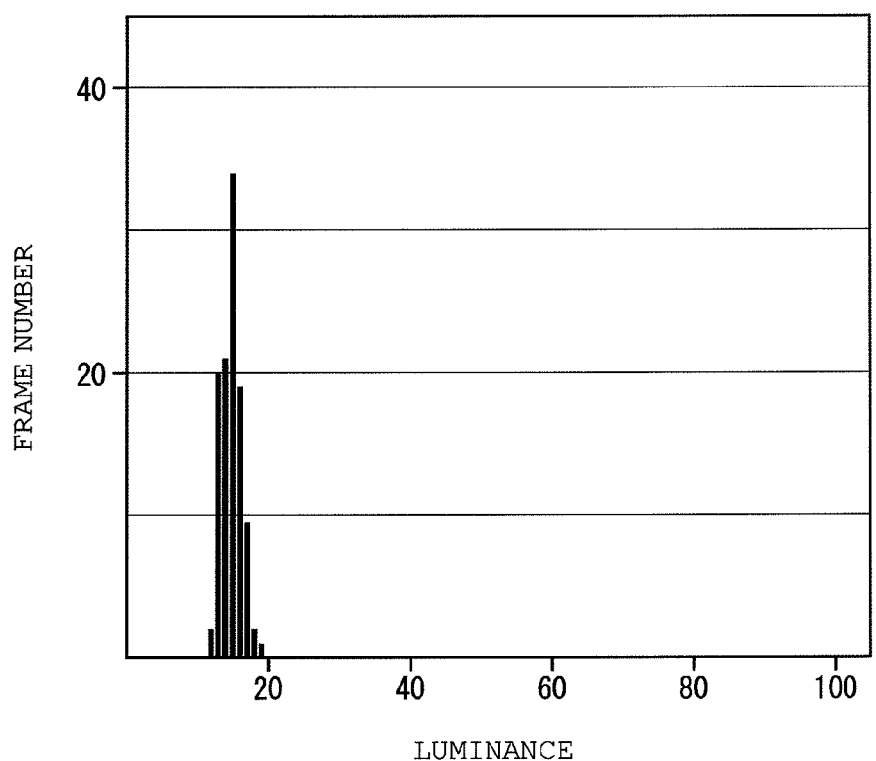
FIG. 18 is a luminance histogram of a certain pixel.
Figure 19:
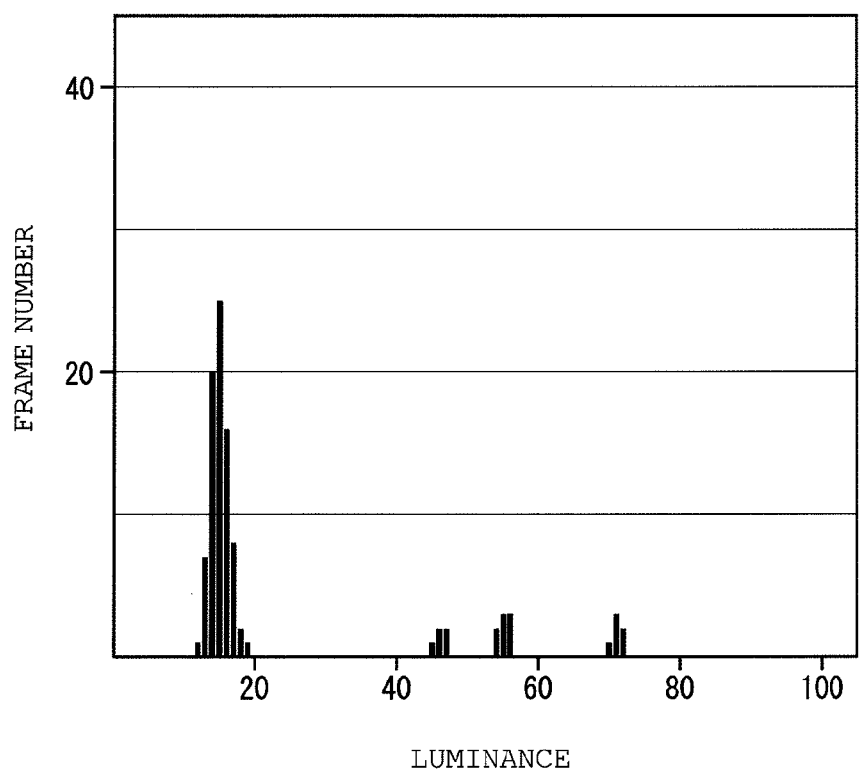
FIG. 19 is a luminance histogram of another pixel.
Figure 20:
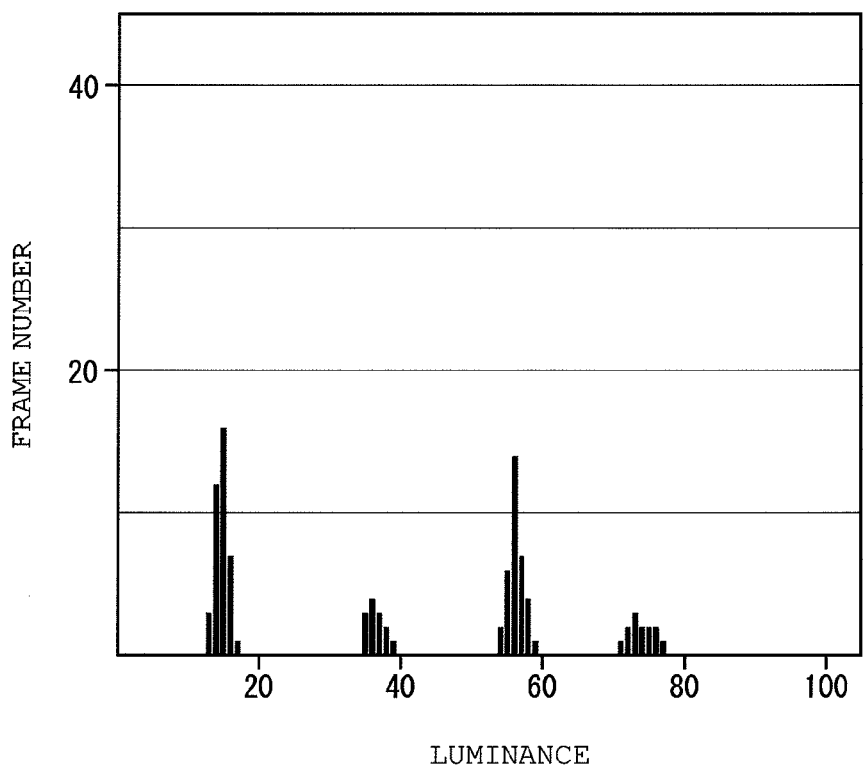
FIG. 20 is a luminance histogram of still another pixel.

The calculating part 16 produces a luminance histogram for the whole frame set (STEP73). An example of the luminance histogram for a certain pixel is shown in FIG. 18. In the luminance histogram, a class is luminance. The histogram includes 100 classes of 1 to 100. In the histogram, a frequency is a frame number. The frequency may be subjected to smoothing processing. An example of a luminance histogram of another pixel is shown in FIG. 19. An example of a luminance histogram of still another pixel is shown in FIG. 20. In each of the luminance histograms, the total of the frames is 98.

Figure 21:
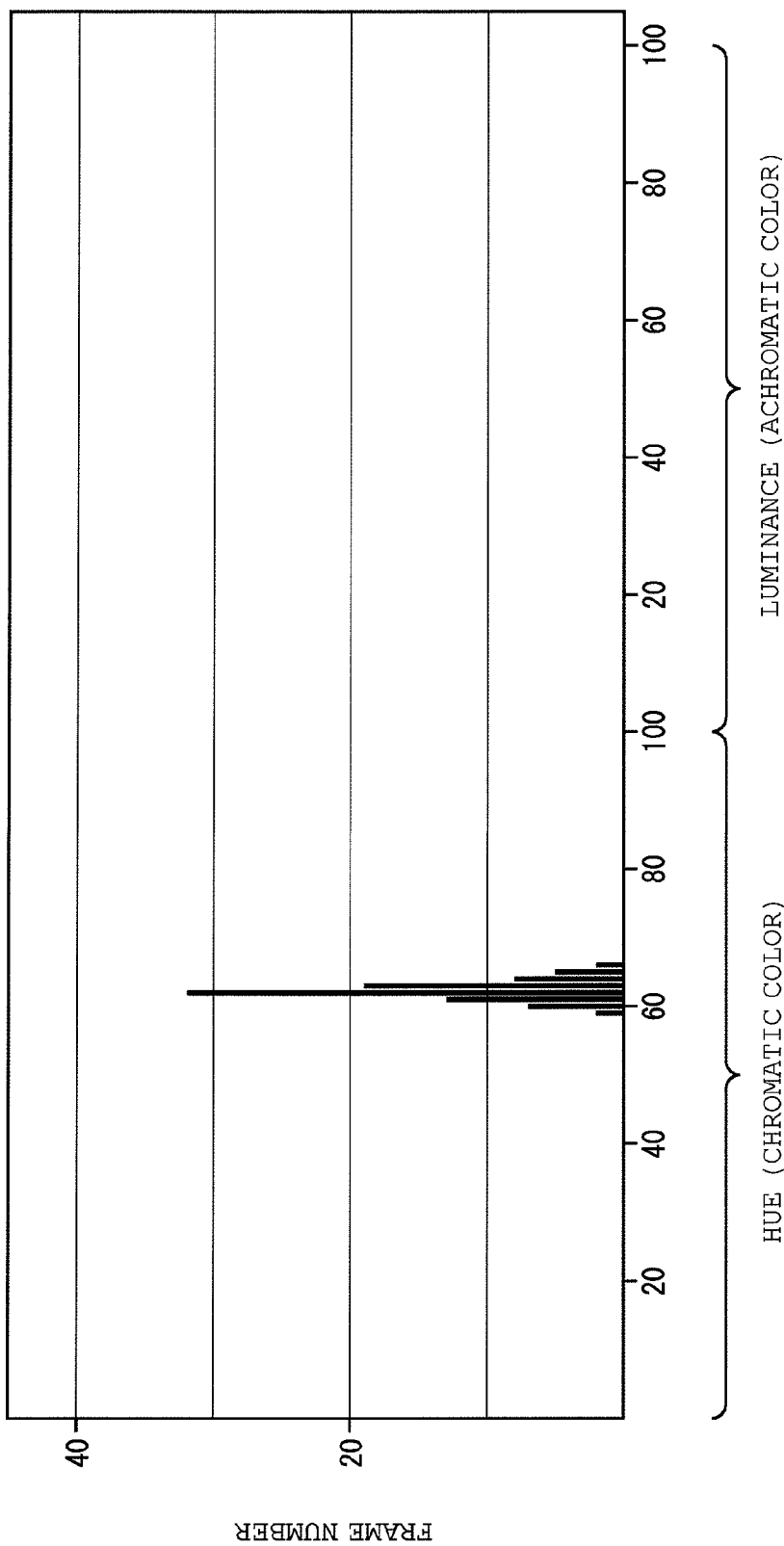
FIG. 21 is a color histogram of a pixel of FIG. 18.
Figure 22:
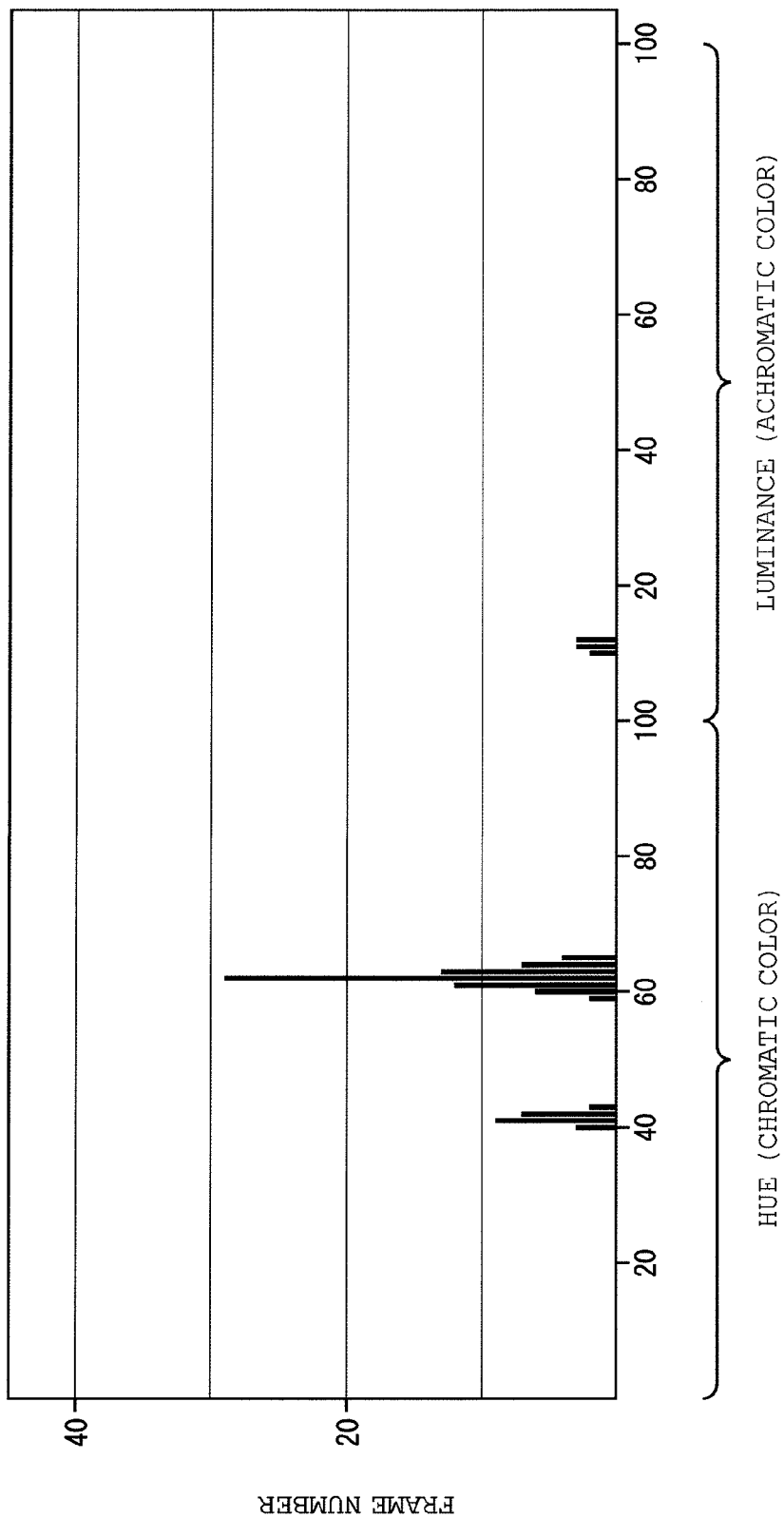
FIG. 22 is a color histogram of a pixel of FIG. 19.
Figure 23:
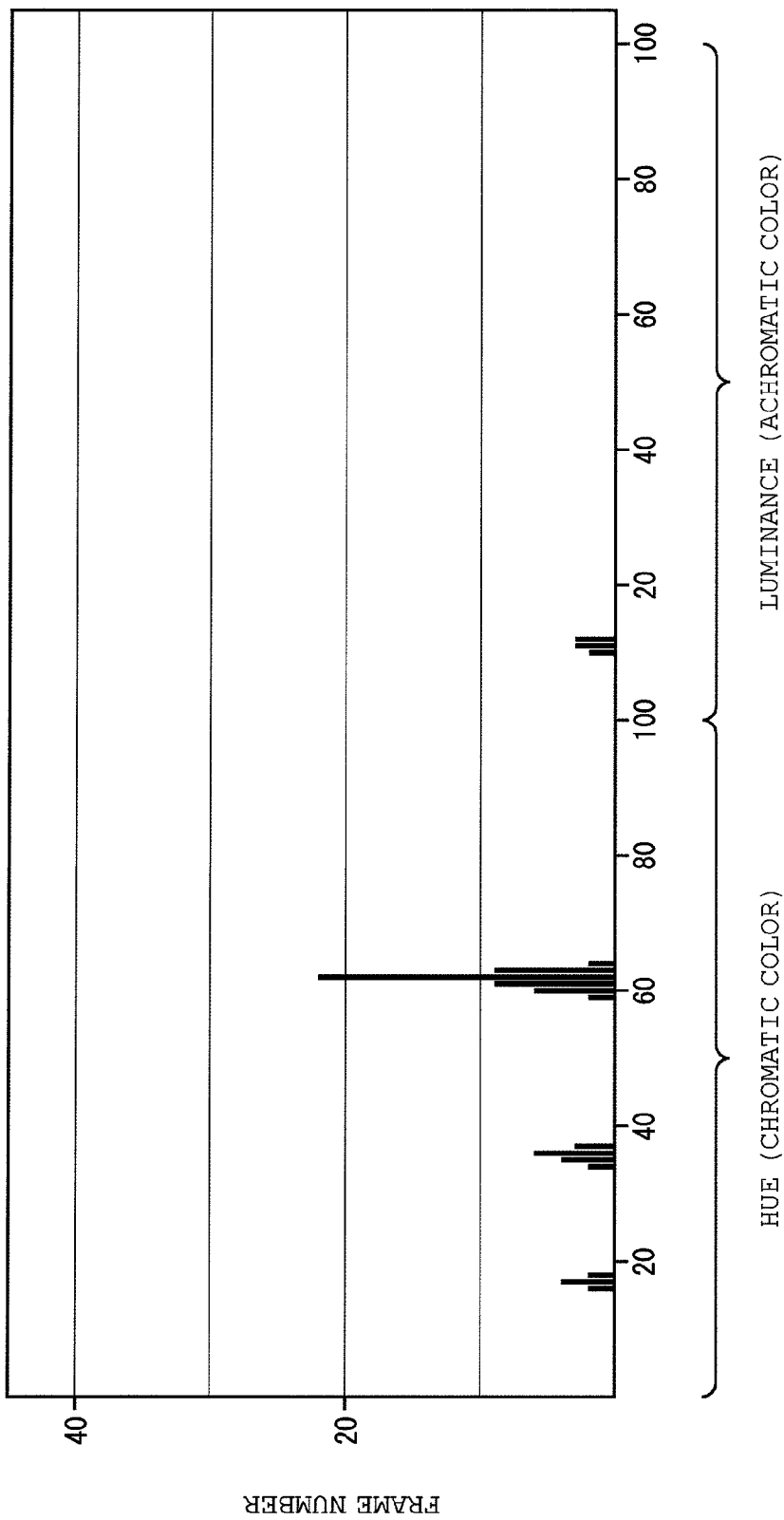
FIG. 23 is a color histogram of a pixel of FIG. 20.

The calculating part 16 produces a color histogram for the chromatic color frame set and the achromatic color frame set (STEP74). An example of the color histogram for a certain pixel is shown in FIG. 21. The color histogram is obtained by combining the histogram of the chromatic color frame set with the histogram of the achromatic color frame set. In the color histogram, the class of the chromatic color frame set is hue. The class of the hue includes 100 classes of 1 to 100. In the color histogram, the class of the achromatic color frame set is luminance. The class of the luminance includes 100 classes of 1 to 100. The total number of the classes is 200. In the color histogram, a frequency is a frame number. The frequency may be subjected to smoothing processing. An example of a color histogram of another pixel is shown in FIG. 22. An example of a color histogram of still another pixel is shown in FIG. 23. In each of the color histograms, the total of the frames is 98.

It is decided whether each of the pixels is the background scene or the photographic subject based on the luminance histogram and the color histogram (STEP75). The decision is conducted by the calculating part 16. The decision includes a first stage, a second stage, and a third stage. Hereinafter, the stages will be described in detail.

Figure 24:
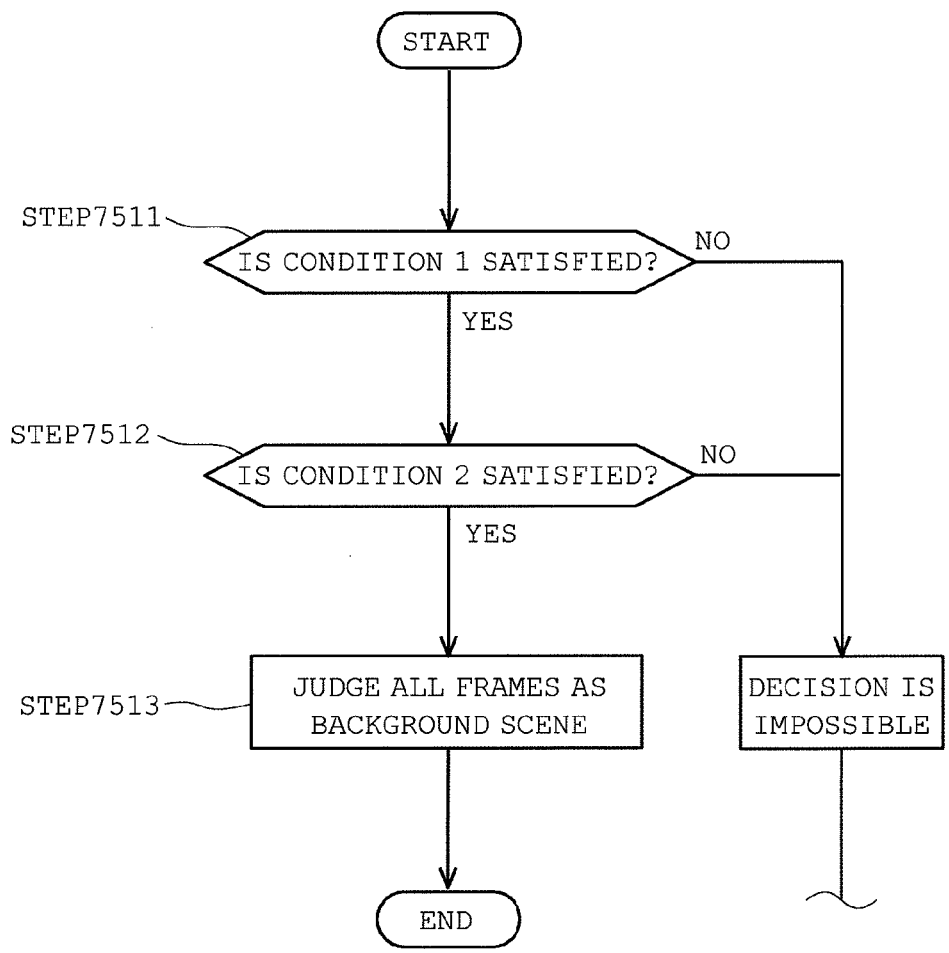
FIG. 24 is a flowchart showing a first stage of a deciding step of the method of FIG. 15.

FIG. 24 is a flow chart showing the first stage. The first stage is conducted for each of the pixels. In the first stage, it is first judged whether a condition 1 is satisfied (STEP7511). The condition 1 is as follows.

Condition 1: In the luminance histogram, all the frames are included in a range in which a class width is equal to or less than 20.

Values other than "20" may be used as the class width.

In the luminance histogram of FIG. 18, all the frames are included in a range in which luminance is 12 to 19 (that is, a width is 8). Therefore, the luminance histogram satisfies the condition 1. In the luminance histogram of FIG. 19, the minimum value of the class is 12, and the maximum value thereof is 72. Therefore, the luminance histogram does not satisfy the condition 1. In the luminance histogram of FIG. 20, the minimum value of the class is 13 and the maximum value thereof is 77. Therefore, the luminance histogram does not satisfy the condition 1.

Next, it is judged whether a condition 2 is satisfied (STEP7512). The condition 2 is as follows.

Condition 2: In the color histogram, all the frames are included in a range in which the class width is equal to or less than 20.

Values other than "20" may be used as the class width.

FIG. 21 is a color histogram for the pixel of FIG. 18. FIG. 22 is a color histogram for the pixel of FIG. 19. FIG. 23 is a color histogram for the pixel of FIG. 20. In the color histogram of FIG. 21, all the frames are included in a range in which hue is 59 to 66 (that is, a width is 7). Therefore, the color histogram satisfies the condition 2. In the color histogram of FIG. 22, the minimum value of the class of hue is 40, and the maximum value thereof is 65. Furthermore, in the histogram of FIG. 22, the class of luminance has a frequency.

Therefore, the color histogram does not satisfy the condition 2. In the color histogram of FIG. 23, the minimum value of the class of hue is 16, and the maximum value thereof is 64. Furthermore, in the histogram of FIG. 23, the class of luminance has a frequency. Therefore, the color histogram does not satisfy the condition 2.

In the pixels shown in FIGS. 18 and 21, the luminance histogram satisfies the condition 1, and the color histogram satisfies the condition 2. When the golf player 24 swings, the golf player 24 moves. Both the golf player 24 and the background scene can be photographed in the pixel due to the motion. When both the golf player 24 and the background scene are photographed, the luminance or the hue of the pixel fluctuates widely. The pixel satisfying both the conditions 1 and 2 is a pixel in which the fluctuation of the luminance and the hue is small. In other words, it is considered that the golf player 24 is not photographed between the first frame and the final frame in the pixel. The pixel satisfying the conditions 1 and 2 is decided as the "background scene" in all the frames (STEP7513).

The chromatic color and the achromatic color having the same luminance cannot be discriminated in the luminance histogram, but can be discriminated in the color histogram. The two chromatic colors having the same hue and the different luminance cannot be discriminated in the color histogram, but can be discriminated in the luminance histogram. When both the conditions 1 and 2 are satisfied in the silhouette extracting method according to the present invention, the pixel is decided as the "background scene" in all the frames. In other words, a decision is conducted by considering both the luminance histogram and the color histogram. Therefore, the pixel which is not the background scene is almost never falsely recognized as the background scene.

Even the pixel in which only the golf player 24 is photographed between the first frame and the final frame can satisfy the conditions 1 and 2. However, as described above, since the golf player 24 is subjected to masking by the mask 36, the pixel satisfying the conditions 1 and 2 can be decided as the "background scene" in all the frames.

The pixel in which both the golf player 24 and the background scene are photographed between the first frame and the final frame does not satisfy the condition 1 or 2. The decision of the pixel which does not satisfy the condition 1 or 2 is carried over to a second stage.

Figure 25:
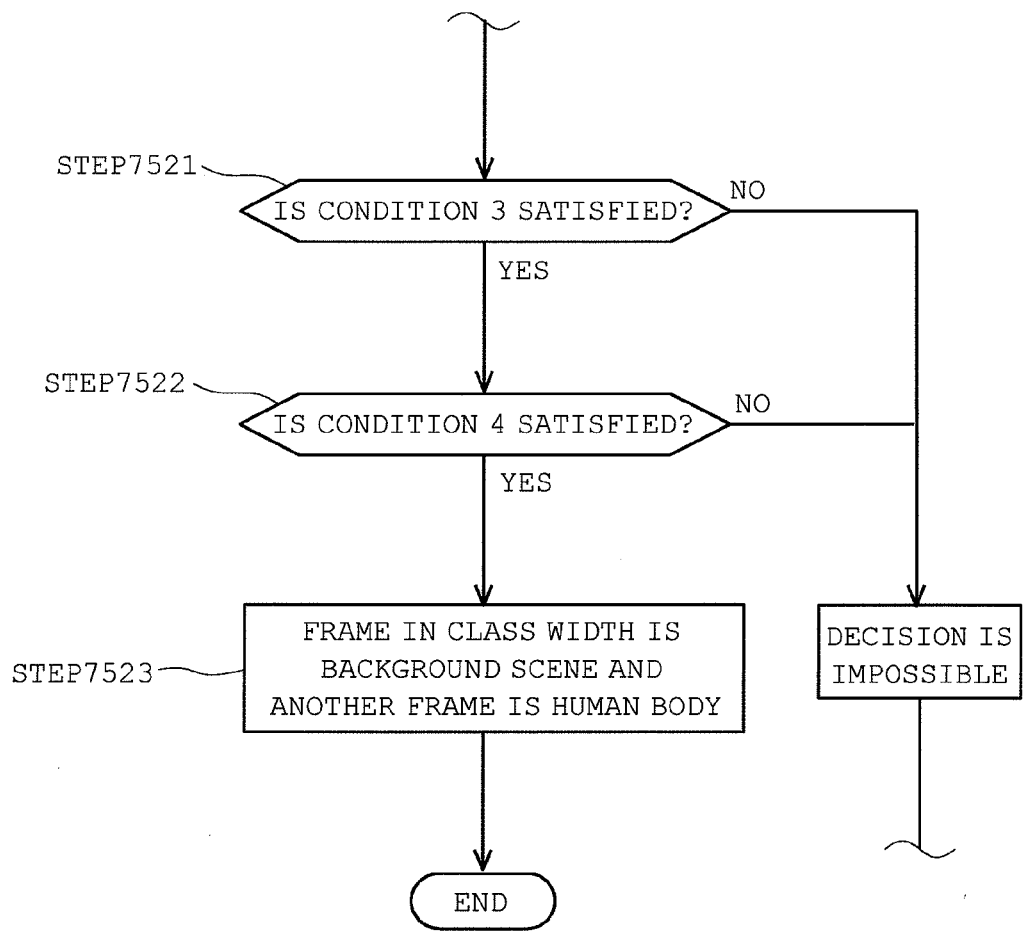
FIG. 25 is a flow chart showing a second stage of the deciding step of the method of FIG. 15.

Hereinafter, the second stage will be described in detail. In the first stage, the pixel judged as "both the golf player 24 and the background scene are photographed" is further considered in the second stage. FIG. 25 is a flow chart showing the second stage. The second stage is conducted for each of the pixels. In the second stage, it is first judged whether a condition 3 is satisfied (STEP7521). The condition 3 is as follows.

Condition 3: In the luminance histogram, a range in which the class width is equal to or less than 20 includes equal to or greater than 60% of all the frames.
Values other than "20" may be used as the class width. Values other than "60%" may be used as a ratio.

In the luminance histogram of FIG. 19, a range in which luminance is 12 to 19 (that is, a width is 8) includes 80 (that is, 81.6%) frames. Therefore, the condition 3 is satisfied. The condition 3 is not satisfied in the luminance histogram of FIG. 20.

Next, it is judged whether a condition 4 is satisfied (STEP7522). The condition 4 is as follows.

Condition 4: In the color histogram, a range in which the class width is equal to or less than 20 includes equal to or greater than 60% of all the frames.
Values other than "20" may be used as the class width. Values other than "60%" may be used as a ratio.

In the color histogram of FIG. 22, a range in which luminance is 59 to 65 (that is, a width is 7) includes 72 (that is, 73.5%) frames. Therefore, the condition 4 is satisfied. The condition 4 is not satisfied in the color histogram of FIG. 23.

In the pixels shown in FIGS. 19 and 22, the luminance histogram satisfies the condition 3, and the color histogram satisfies the condition 4. When the range in which the class width is equal to or less than 20 includes equal to or greater than 60% of all the frames, the fluctuation of the luminance or the hue is considered to be small in the pixel of the frame group in the class width. On the other hand, the luminance or the hue of the pixel of the frame group outside the class width is considered to be greatly different from the luminance or the hue of the pixel of the frame in the class width. It is considered that the background scene is mainly photographed in the pixel and the human body of the golf player 24 is temporarily photographed between the first frame and the final frame from the phenomenon. For the pixel satisfying the conditions 3 and 4, the frame in the class width is decided as the "background scene", and the other frame is decided as the "photographic subject" (STEP7523).

The chromatic color and the achromatic color having the same luminance cannot be discriminated in the luminance histogram, but can be discriminated in the color histogram. The two chromatic colors having the same hue and the different luminance cannot be discriminated in the color histogram, but can be discriminated in the luminance histogram. A decision is conducted based on both the conditions 3 and 4 in the silhouette extracting method according to the present invention. In other words, a decision is conducted by considering both the luminance histogram and the color histogram. Therefore, false recognition is suppressed.

The decision of the pixel presenting the histogram as shown in FIGS. 20 and 23 is carried over to a third stage.

Hereinafter, the third stage will be described in detail. The pixel carried over in the second stage and the pixel corresponding to the mask 36 are further considered in the third stage. Hereinafter, the pixel in which a decision of the "background scene" or the "photographic subject" has been already conducted is referred to as a "deciding completion pixel". On the other hand, the pixel in which the decision of the "background scene" or the "photographic subject" has not yet been conducted is referred to as a "deciding noncompletion pixel".

Figure 26:
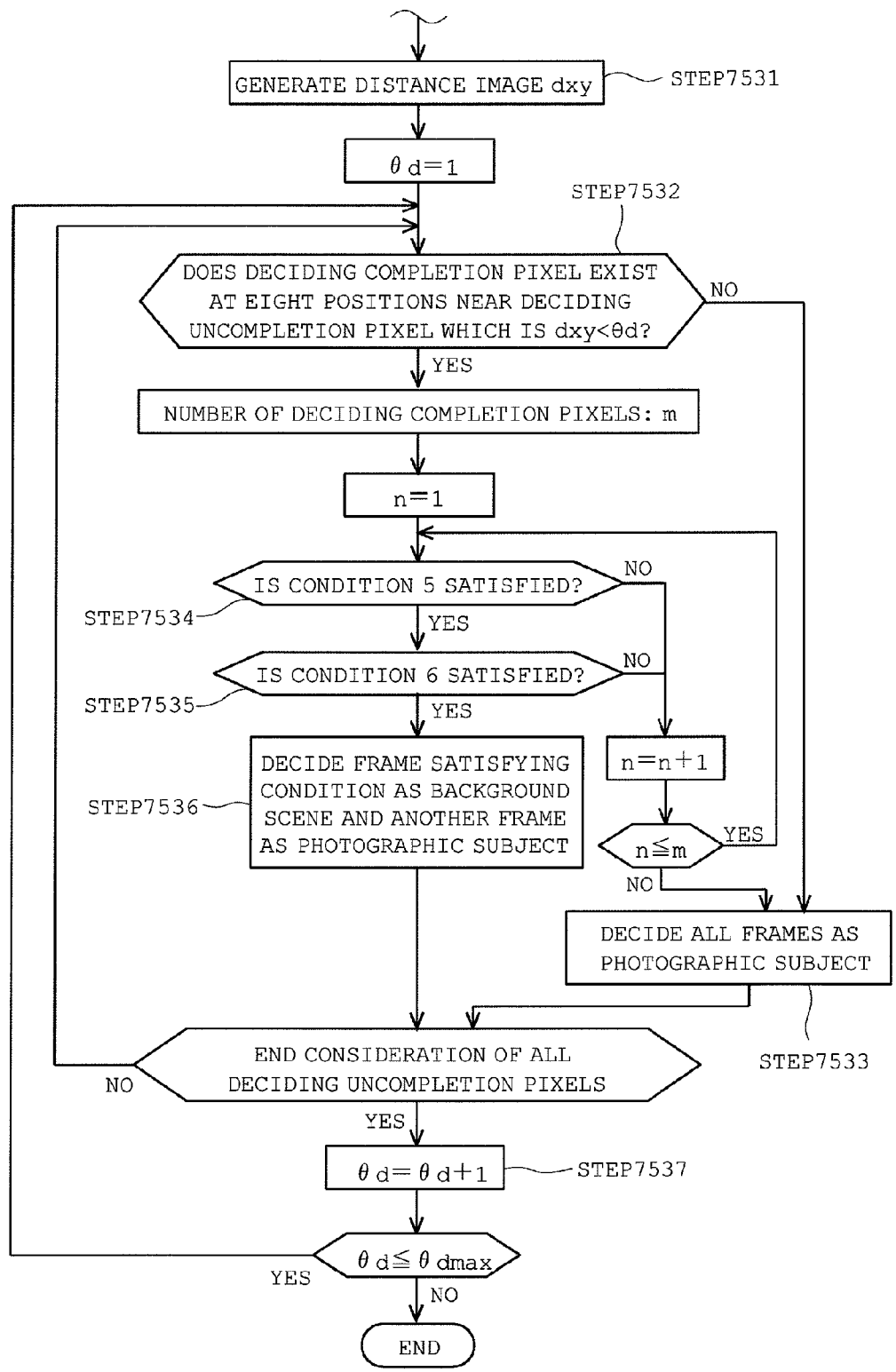
FIG. 26 is a flow chart showing a third stage of the deciding step of the method of FIG. 15.

FIG. 26 is a flow chart showing the third stage. In the third stage, a distance image dxy is generated for the deciding noncompletion pixel (STEP7531). The distance image dxy is obtained by adding depth data to two-dimensional data. Herein, the depth data is a distance to a boundary.

When an initial value of the threshold value θd is 1, it is considered whether the deciding completion pixel exists at eight positions near the deciding noncompletion pixel in which dxy is less than θd (STEP7532). Herein, "eight positions near the deciding noncompletion pixel" implies eight pixels placed at the left position, the upper left position, the upper position, the upper right position, the right position, the lower right position, the lower position, and the lower left position of the deciding noncompletion pixel.

When the deciding completion pixel does not exist at eight positions near the deciding noncompletion pixel at all, the pixel is decided as the "photographic subject" in all the frames (STEP7533). When one or two or more deciding completion pixels exist at eight positions near the deciding noncompletion pixel, it is judged whether the following condition 5 is satisfied (STEP7534). The condition 5 is as follows.

Condition 5: A frame group satisfying the following numerical expressions exists in the luminance histogram.

$$\min(LQ) > \min(LB) - \theta w$$

$$\max(LQ) < \max(LB) + \theta w$$

In these numerical expressions, min (LQ) is the minimum value of the class width of the frame group in the luminance histogram of the deciding noncompletion pixel; max (LQ) is the maximum value of the class width of the frame group in the luminance histogram of the deciding noncompletion pixel; min (LB) is the minimum value of the class width of the frame group which is the background scene in the luminance histogram of one deciding completion pixel existing at eight positions near the deciding noncompletion pixel; and max (LB) is the maximum value of the class width of the frame group which is the background scene in the luminance histogram of one deciding completion pixel existing at eight positions near the deciding noncompletion pixel. $\theta w$ is suitably set. The present inventor uses 6 as $\theta w$.

When one or two or more deciding completion pixels exist at eight positions near the deciding noncompletion pixel, it is judged whether the following condition 6 is further satisfied (STEP7535). The condition 6 is as follows.

Condition 6: A frame group satisfying the following numerical expressions exists in the color histogram.

$$\min(CQ) > \min(CB) - \theta w$$

$$\max(CQ) < \max(CB) + \theta w$$

In these numerical expressions, min (CQ) is the minimum value of the class width of the frame group in the color histogram of the deciding noncompletion pixel; max (CQ) is the maximum value of the class width of the frame group in the color histogram of the deciding noncompletion pixel; min (CB) is the minimum value of the class width of the frame group which is the background scene in the color histogram of one deciding completion pixel existing at eight positions near the deciding noncompletion pixel; and max (CB) is the maximum value of the class width of the frame group which is the background scene in the color histogram of one deciding completion pixel existing at eight positions near the deciding noncompletion pixel. $\theta w$ is suitably set. The present inventor uses 6 as $\theta w$.

The pixel of the frame group satisfying the conditions 5 and 6 is decided as the "background scene". The pixel of the frame group which does not satisfy the conditions 5 and 6 is decided as the "photographic subject" (STEP7536). When either of the conditions 5 and 6 is not satisfied in the relationship with the deciding completion pixel, and the other deciding completion pixel exists at eight positions near the deciding noncompletion pixel, it is judged whether the conditions 5 and 6 are satisfied in the relationship with the other deciding completion pixel.

After the consideration of the conditions 5 and 6 is completed for all the deciding noncompletion pixels, "1" is added to $\theta d$ (STEP7537). A flow of a consideration (STEP7532) of whether the deciding completion pixel exists at eight positions near the deciding noncompletion pixel of the deciding noncompletion pixel to a decision (STEP7536) is repeated. The repetition is conducted until $\theta d$ reaches to $\theta dmax$. $\theta dmax$ is the maximum value in the distance image.

Figure 27:
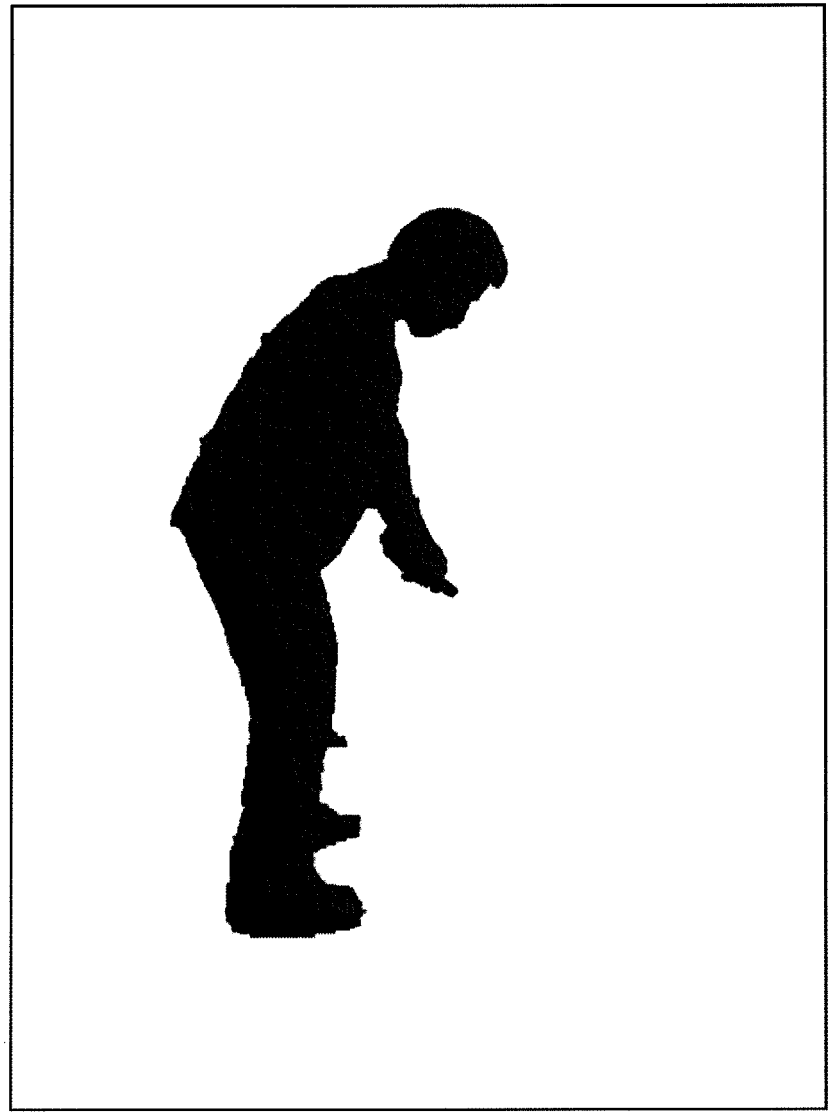
FIG. 27 is an illustration for showing a silhouette obtained in the method of FIG. 15.

All the pixels of all the frames are discriminated as any one of the "background scene" and the "photographic subject" by the flow. The set of the pixels as the photographic subject is a silhouette of the photographic subject in each of the frames. A silhouette of a frame specified as an address is shown in FIG. 27. In FIG. 27, the pixel of the photographic subject is shown by black, and another pixel is shown by white. As is apparent from FIG. 27, the contour of the photographic subject is almost faithfully reproduced by the method.

Figure 28:
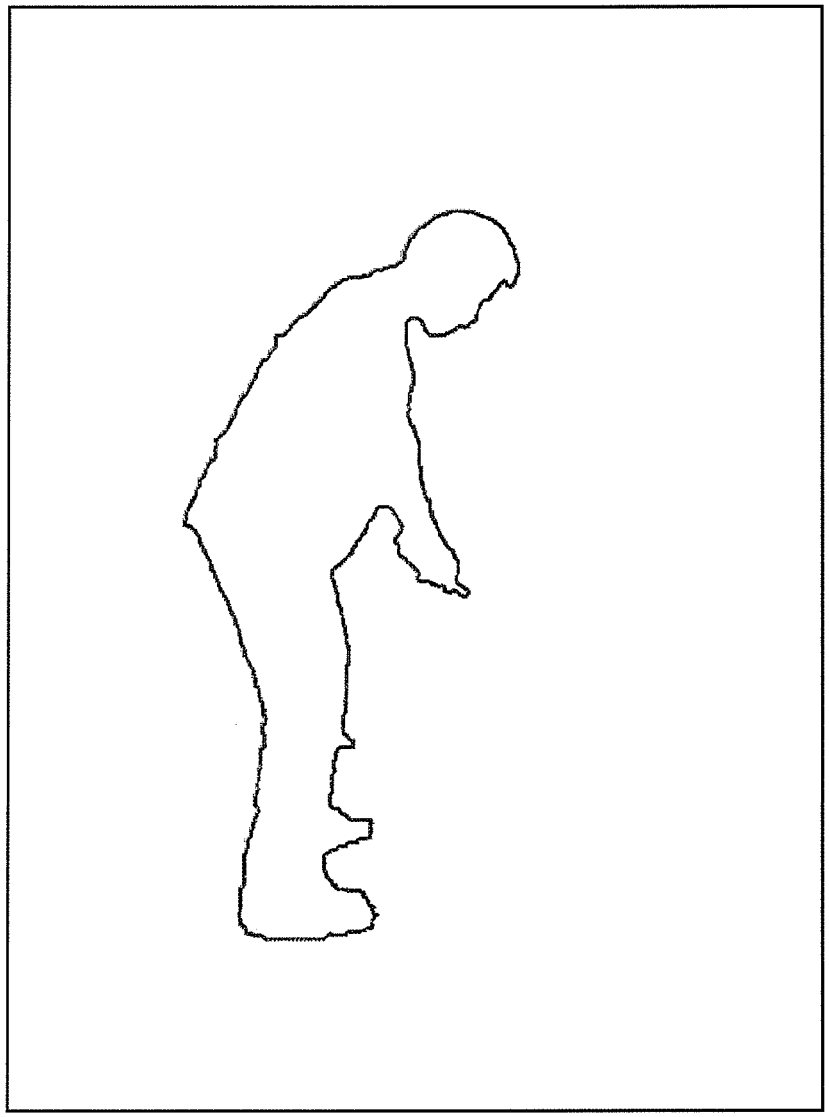
FIG. 28 is an illustration for showing the contour of the silhouette of FIG. 27.

A boundary between the silhouette of FIG. 27 and the background scene is shown in FIG. 28. The boundary is a contour of the photographic subject (golf player 24). FIG. 28 shows the contour of the golf player 24 in the address. The calculating part 16 decides the quality of the swing based on the contour (STEP8).

Figure 29:
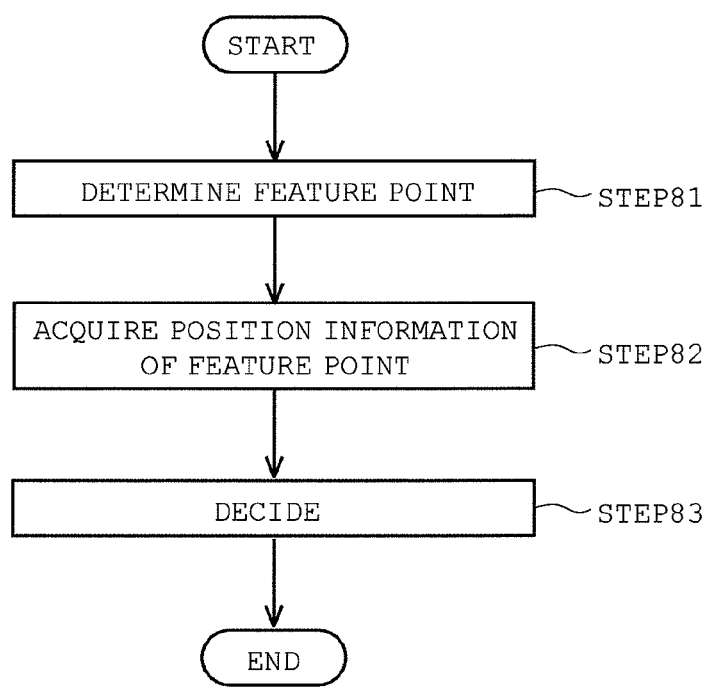
FIG. 29 is a flowchart of a deciding method using a feature point.

A flow chart for the deciding the swing from the contour of the photographic subject is shown in FIG. 29. The calculating part 16 determines a feature point from the contour (STEP81). The feature point is a point expressing the region of the photographic subject such as the golf player 24 or the golf club 22. The feature point is a point expressing the region of the photographic subject used for deciding. Specifically, the calculating part 16 determines a feature point for judging the posture of the golf player 24 such as a base of a neck, a waist, a knee joint, or an elbow, and a feature point for judging the position of the golf club such as a grip end of the golf club 22. The calculating part 16 acquires position information of the feature point (STEP82). The calculating part 16 decides the quality of the swing from the position information (STEP83).

Figure 30:
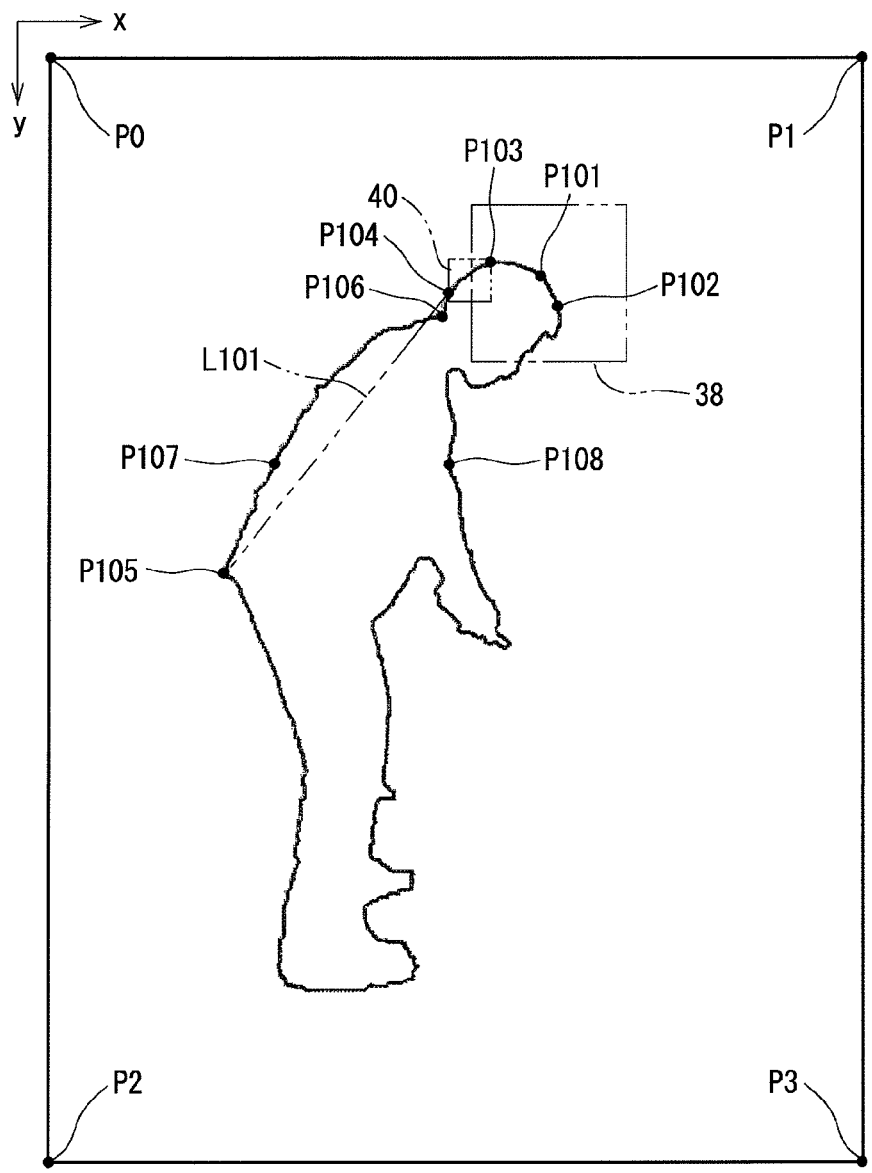
FIG. 30 is an illustration for determining a feature point from a contour of an address.

A method for determining a feature point of the base of the neck in the address will be described with reference to FIG. 30. The frame of the address includes pixels of 480×640. In FIG. 30, the frame is expressed as x-y-coordinates including each pixel as one unit with an upper left end point P0 (0, 0) as an original point. An upper right end is a point P1 (479, 0); a lower left end is a point P2 (0, 639), and a lower right end is a point P3 (479, 639).

A head part search area 38 is provided in FIG. 30. A point P101 of FIG. 30 expresses a point on the contour closest from the upper right end point P1. When the point on the contour and a distance between the point P1 and the point are used as a function, the point P101 is an extreme value, wherein the distance is minimized. Herein, the maximum value or the minimum value of the function is set to the extreme value. For example, both a point on the contour which has a value of x taking a maximum value or a minimum value on the x-y-coordinates and a point on the contour which has a value of y taking a maximum value or a minimum value are extreme values. In a function of a certain point and a distance between the certain point and a line, or a function of a certain point and a distance between the certain point and another point, the certain point bringing about the maximized or minimized distance is an extreme value. A value of an x-coordinate of the point P101 is expressed as $x_{101}$, and a value of a y-coordinate is expressed as $y_{101}$. Similarly, x of a point P102 is $x_{102}$, and y is $y_{102}$. In the following description, unless otherwise noted, the values of x and y of each point are expressed as in the point P101 and the point P102.

The point P102 is an extreme value, wherein x is a maximum value $x_{102}$ in the pixel constituting the contour in the head part search area 38. A point P103 is an extreme value, wherein y is a minimum value $y_{103}$ in the pixel constituting the contour in the head part search area 38. The head part search area 38 is a predetermined range with the point P101 as a base point. For example, the head part search area is a pixel range in which x is $x_{101}-30$ or greater and $x_{101}+30$ or less and y is $y_{in}-30$ or greater and $y_{101}+30$ or less. The point P101 to the point P103 specify the head part of the golf player 24. The predetermined range may be defined from the geometrical position relation of the region of the photographic subject. In other words, the search area is set based on the geometrical position relation between the extreme value and the region of the human body. The predetermined range of another search area in the following description can be also similarly set.

A back head part search area 40 is provided in FIG. 30. The back head part search area 40 is a predetermined range with the point P103 as a base point. A point P104 is an extreme value, wherein a value of x is a minimum value $x_{104}$ in the pixel constituting the contour in the back head part search area 40. The point P104 shows the position of the back head part. The point P104 is a reference point determined from the point P101 which is the extreme value. For example, the back head part search area 40 is a pixel range in which x is $x_{103}$−10 or greater and $x_{103}$ or less and y is $y_{103}$ or greater and $y_{103}$+10 or less.

A point P105 is an extreme value, wherein a value of x on the contour is a minimum value $x_{105}$. The point P105 shows the position of a back waist. A chain double-dashed line L101 is a straight line passing through the point P104 which is the reference point and the point P105 which is the extreme value. A distance between the straight line L101 and the contour is calculated. A distance between the contour located on the left side of the straight line L101 and the straight line L101 is defined as − (minus). A distance between the contour located on the right side of the straight line L101 and the straight line L101 is defined as + (plus). A point on the contour is defined as a point P106, wherein a distance between the point on the contour and the straight line L101 is maximized. The point P106 shows the feature point of the base of the neck.

Figure 31:
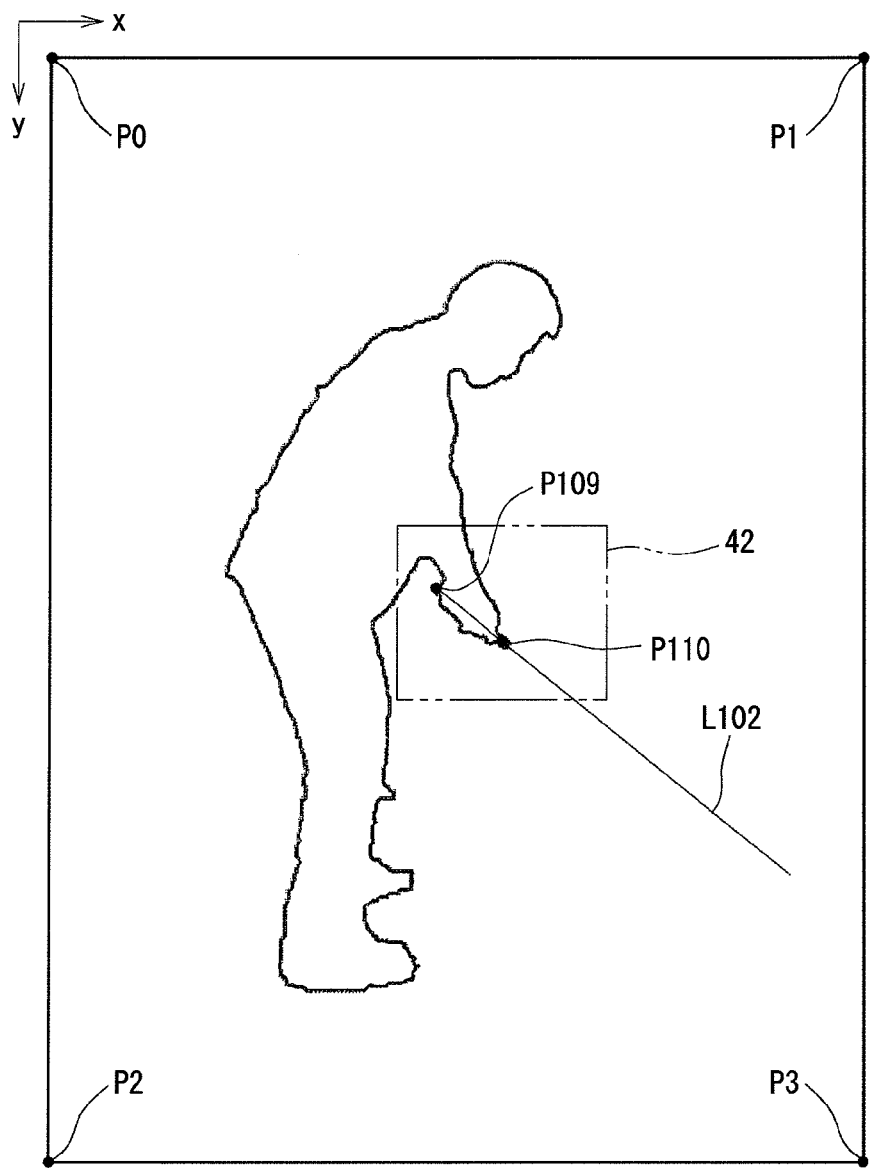
FIG. 31 is an illustration for determining another feature point from the contour of the address.

A method for determining a feature point of the grip end will be described with reference to FIG. 31. A straight line L102 of FIG. 31 shows a shaft line. The shaft line L102 is obtained by subjecting the frame of the top and the frame of the address to difference processing. The shaft line L102 is obtained by Hough transforming after the difference processing. FIG. 31 is obtained by stacking the shaft line L102 on the silhouette of FIG. 27.

A grip end search area 42 is provided in FIG. 31. For example, a first frame 26 is used for the grip end search area 42. A point P109 and a point P110 show intersection points between the contour and the shaft line L102. In the grip end search area 42, the intersection point having a small value of x is defined as the grip end. In FIG. 31, $x_{109}$ is smaller than $x_{110}$. The point P109 is defined as the grip end.

The number of the intersection points between the contour and the shaft line L102 may be 1 in the determination of the feature point of the grip end. For example, it is a case of a silhouette in which a hand and an abdomen are integrated with each other. In this case, the one point is detected. When two points are not detected, it is decided that the grip end is not detected. The swing can be diagnosed with the one point excluded from diagnosing processing.

A method for determining feature points of a right knee point and a right knee joint will be described with reference to FIG. 32. A heel search area 44 is provided in FIG. 32. The heel search area 44 is a predetermined range with the point P105 as a base point. For example, the heel search area 44 is a pixel range in which x is $x_{105}$ or greater and 479 or less and y is $y_{105}$ or greater and 639 or less. A point P111 is a point on the contour in the heel search area 44. The point P111 is a point closest to the point P2, and is an extreme value. The point P111 shows a heel.

A chain double-dashed line L103 is a straight line passing through the point P105 which is an extreme value, and the point P111 which is an extreme value. In a function of a point on the contour of the point P105 to the point P111 and a distance between the point on the contour and the straight line L103, a point P112 is an extreme value, wherein the distance is maximized. The point P112 shows a temporary posterior knee. A feature point P113 of a posterior knee is determined using a Bezier curve from the point P112 of the temporary posterior knee.

Figure 33:
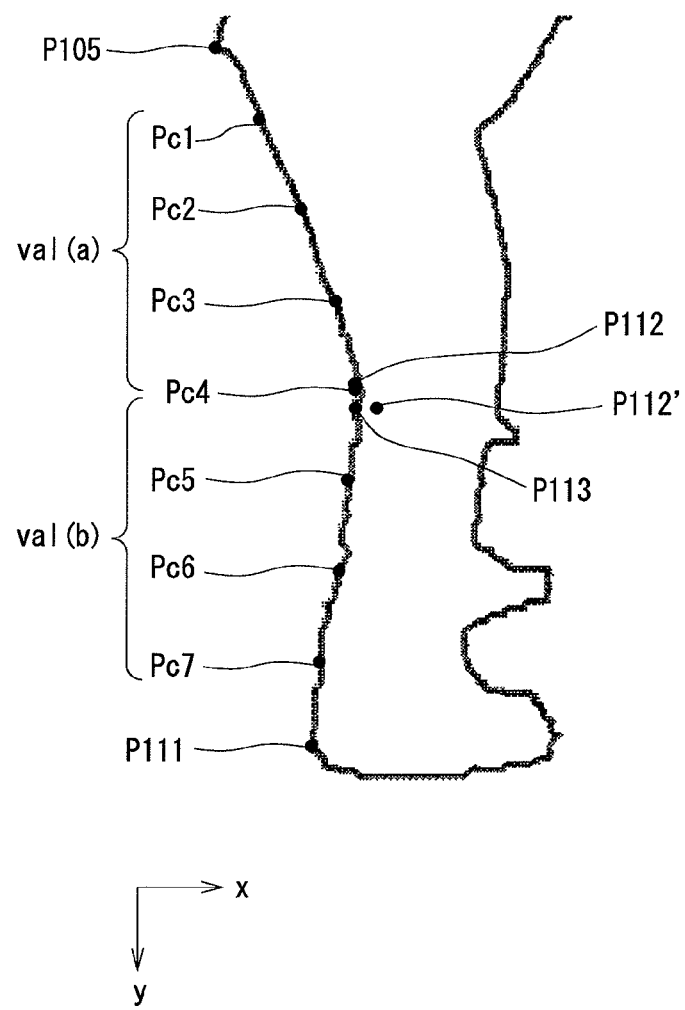
FIG. 33 is an illustration for determining still another feature point from the contour of the address.

As shown in FIG. 33, a control point is set in a predetermined range on the basis of the point P112 of the temporary posterior knee. Herein, as an example, the contour is approximated with the Bezier curve at seven control points Pc1 to Pc7 disposed at equal intervals. The control points Pc1 to Pc7 are points on the contour. An upper end point of the predetermined range is the point Pct, and a lower end point thereof is the point Pc7. The contour is equally divided into four between the point P105 and the point P112. Middle points are defined as the point Pct, the point Pc2, and the point Pc3 toward the point P112 side from the point P105 side by equally dividing the contour into four. The point P112 is defined as the point Pc4. The contour between the point P112 and the point P111 is equally divided into four. Middle points are defined as the point Pc5, the point Pc6, and the point Pc7 toward the point P111 side from the point Pc4 side by equally dividing the contour into four.

For example, the approximation of the Bezier curve is conducted by using a total evaluation value VAL. Specifically, when an evaluation value of a portion in which a value of y is smaller than the control point Pc4 is defined as val(a) in the range of the point Pc1 to the point Pc7 shown in FIG. 33, and an evaluation value of a portion in which a value of y is greater than the control point Pc4 is defined as val(b), the total evaluation value VAL is calculated by the following numerical expression.

VAL=(val(*a*)+val(*b*))−ABS(val(*a*)−val(*b*))

The evaluation value val(a) is a total value of a difference between the Bezier curve and the contour in the range of the point Poi to the point Pc4. The evaluation value val(b) is a total value of a difference between the Bezier curve and the contour in the range of the point Pc4 to the point Pc7. Herein, ABS (val(a)−val(b)) is an absolute value of a difference between the evaluation value val(a) and the evaluation value val(b).

A plurality of examples of the point Pc1 to the point Pc7 are set with the point Pc4 fixed between the point P105 and the point P111. The Bezier curve when the total evaluation value VAL is maximized in the plurality of examples is determined. When the total evaluation value VAL is maximized, the Bezier curve is most approximated to the contour.

A temporary feature point P112' is provided in a predetermined range on the basis of the point P112 of the temporary posterior knee. For example, the predetermined range is a pixel range in which a value $x_{112'}$ of x is constant and a value of y is $y_{122}$−20 to $y_{112}$+30. The value $x_{112'}$ is greater than the value $x_{112}$. Thereby, the point P112' is located on a + (plus) side in an x-axis direction of the contour of the point Pc1 to the point Pc7. The value of y of the point P112' is increased and decreased. The point P112' moves up and down, and the contour is approximated again with the Bezier curve with the point P112' as the control point. When the total evaluation value VAL is maximized as in the approximation in the Bezier curve, the Bezier curve is most approximated to the contour. The point on the contour closest from the point P112' which is the control point when the Bezier curve is most approximated is defined as a feature point P113 of the posterior knee.

Figure 32:
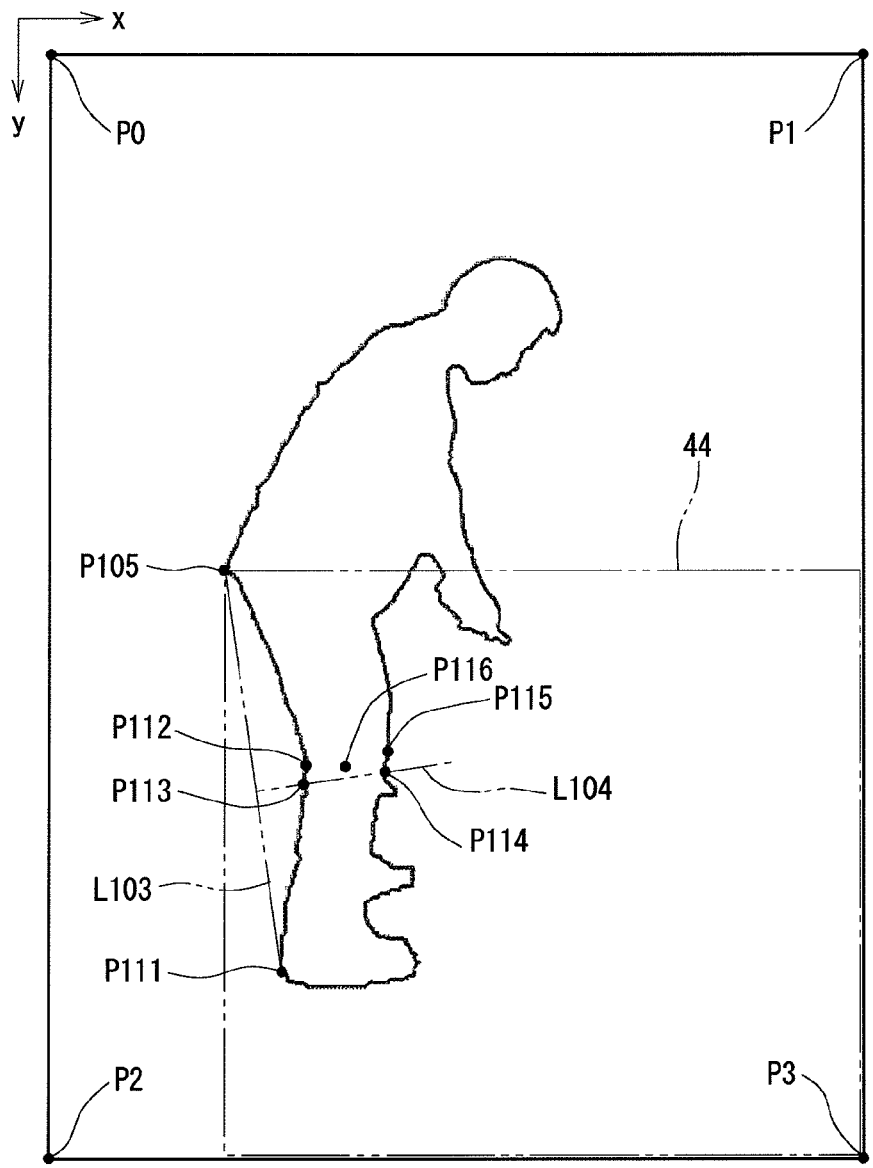
FIG. 32 is an illustration for determining still another feature point from the contour of the address.

A chain double-dashed line L104 of FIG. 32 is a straight line passing through the point P113. The chain double-dashed line L104 is a straight line orthogonal to the straight line L103. A point P114 is an intersection point between the straight line L104 and the contour. The point P114 is defined as a temporary knee point. The contour is approximated with the Bezier curve on the basis of the point P114. As in the feature point P113, the Bezier curve is approximated to the contour to determine the feature point. Thus, a point P115 is determined as the feature point of the knee point.

A point P116 of FIG. 32 shows a middle point of the point P113 and the point P115. The point P116 is defined as the feature point of the knee joint. The point P116 which is the feature point of the knee joint is determined based on the geometrical position relation of the region of the human body.

Figure 34:
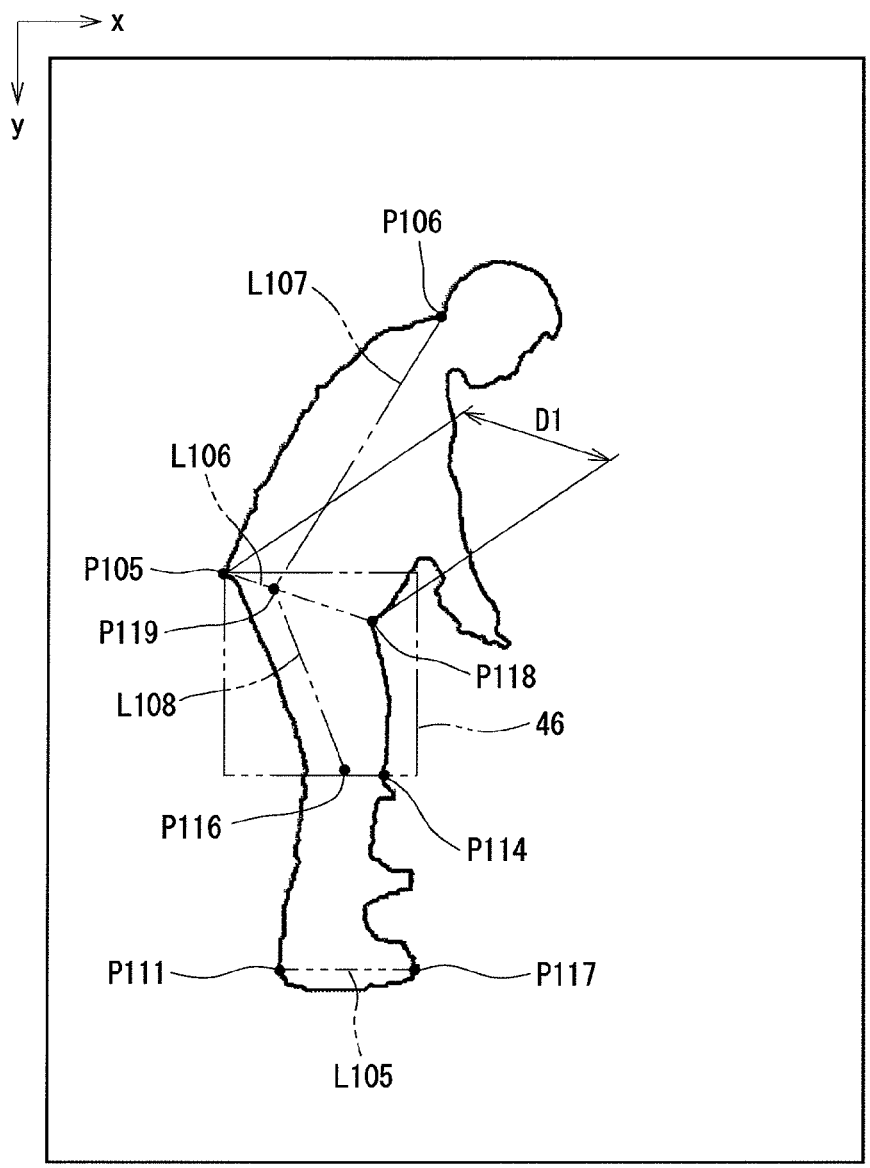
FIG. 34 is an illustration for determining still another feature point from the contour of the address.

A method for determining a feature point of a right tiptoe and a backbone line will be described with reference to FIG. 34. A chain double-dashed line 105 of FIG. 34 is a straight line passing through the point P111. The straight line is parallel to an x-axis. A point P117 is an intersection point between the straight line L105 and the contour. The point P117 is the feature point of the right tiptoe.

A front waist search area 46 of FIG. 34 is a predetermined range with the point P105 as a base point. The front waist search area 46 is a pixel range in which x is $x_{105}$ or greater and $x_{117}$ or less and y is $y_{105}$ or greater and $y_{114}$ or less. A point P118 is a point on the contour. The point P118 is an extreme value, wherein a distance between the point P118 and the point P105 is minimized. The point P118 is the feature point of the front waist. A chain double-dashed line L106 is a straight line passing through the point P105 and the point P118. A point P119 is a point on the straight line L106. When a distance between the point P105 and the point P118 is defined as D1, the point P119 is located at a distance of ⅓ times of D1 from the point P105. The point P119 shows the feature point of the waist. The point P119 is determined based on the geometrical position relation of the region of the human body. A chain double-dashed line L107 is a straight line passing through the point P106 of the base of the neck and the point P119. The straight line L107 is the backbone line in the address.

A method for determining a right thigh line will be described with reference to FIG. 34. A chain double-dashed line L108 of FIG. 34 is a straight line passing through the point P119 and the point P116. The straight line L108 is the right thigh line.

Figure 35:
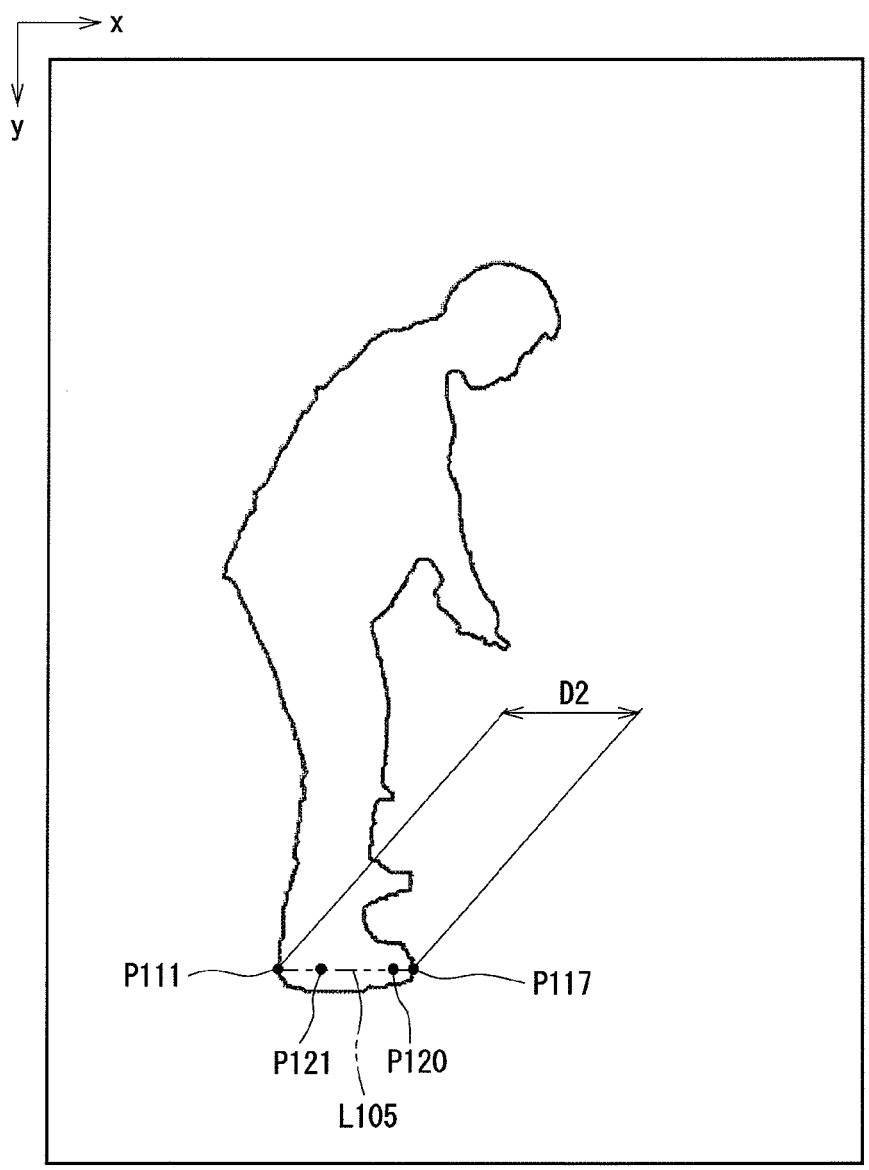
FIG. 35 is an illustration for determining still another feature point from the contour of the address.

A method for determining feature points of a thenar and a right ankle will be described with reference to FIG. 35. A point P120 of FIG. 35 is a point on the straight line L105. When a distance between the point P111 and the point P117 is defined as D2, the point P120 is a point located at a distance of 6/7 times of D2 from the point P111. The point P120 shows the feature point of the thenar. The point P120 is determined based on the geometrical position relation of the region of the human body.

A point P121 of FIG. 35 is a point on the straight line L105. The point P121 is a point located at a distance of ⅜ times of D2 from the point P111. The point P121 shows the feature point of the right ankle. The point P121 is determined based on the geometrical position relation of the region of the human body.

Figure 36:
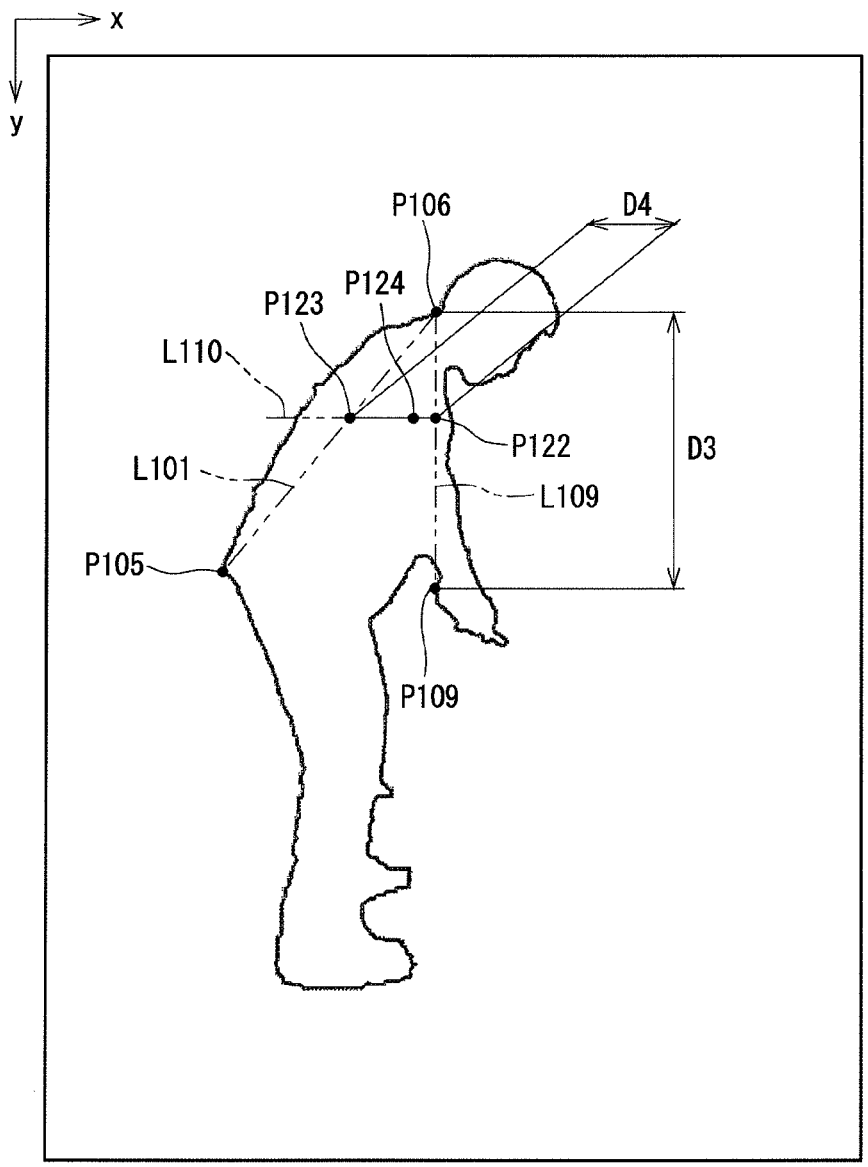
FIG. 36 is an illustration for determining still another feature point from the contour of the address.

A method for determining a feature point of a right shoulder will be described with reference to FIG. 36. A straight line L109 of FIG. 36 is a straight line passing through the point P106 and the point P109. A point P122 is a point on the straight line L109. When a distance between the point P106 and the point P109 is defined as D3, the point P122 is a point located at a distance of ⅜ times of D3 from the point P106. A chain double-dashed line L110 is a straight line passing through the point P122 and extending in the direction of the x-axis. A point P123 is an intersection point between the straight line L101 and the straight line L110. A point P124 is a point on the straight line L110. The point P124 is located between the point P122 and the point P123. When a distance between the point P123 and the point P122 is defined as D4, the point P124 is a point located at a distance of ¾ times of D4 from the point P123. The point P124 shows the feature point of the right shoulder. The point P124 is determined based on the geometrical position relation of the region of the human body.

Thus, the feature points are determined from the contour of the golf player 24. The calculating part 16 determines the feature point P106 of the base of the neck of the golf player, the feature point P116 of the right knee joint, and the feature point P119 of the waist, or the like. The calculating part 16 determines the backbone line (straight line L107), and the thigh line (straight line L108) or the like from these feature points.

Figure 37:
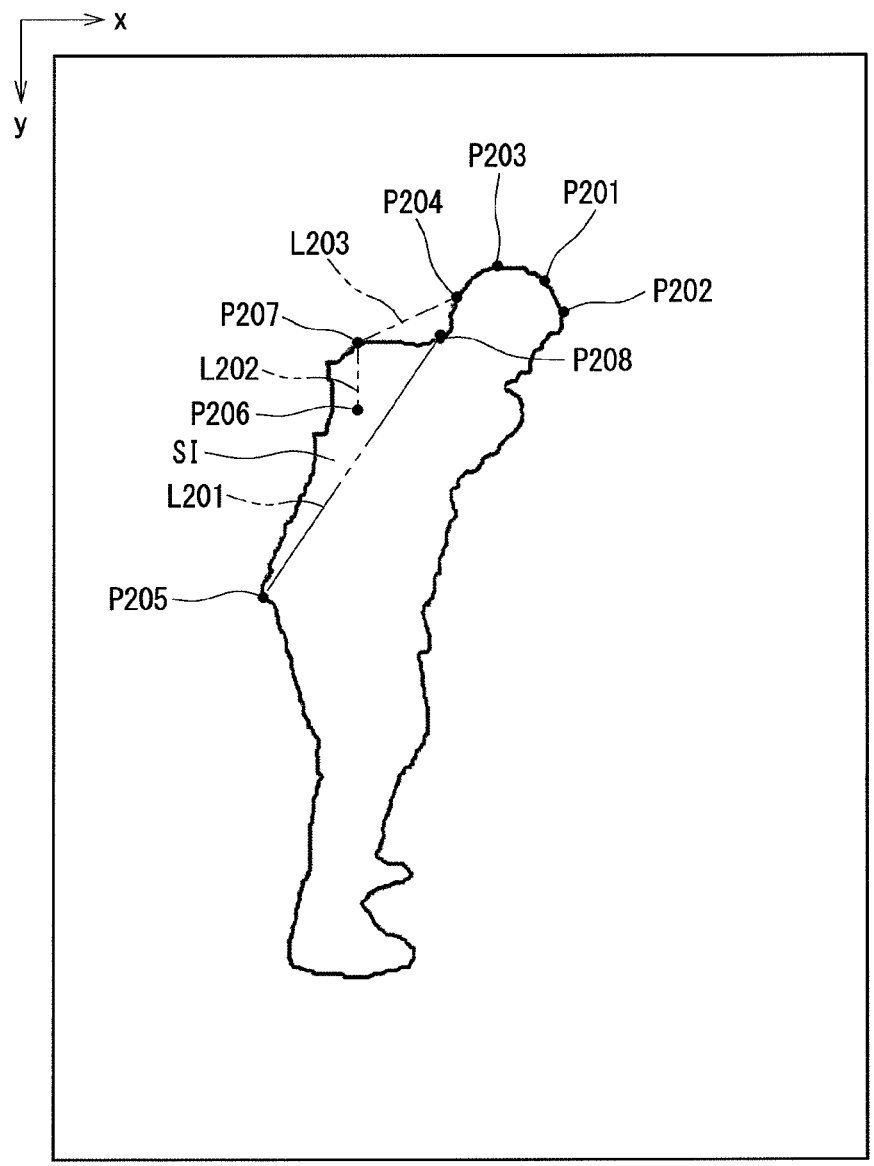
FIG. 37 is an illustration for determining a feature point from a contour of a predetermined position during a takeback.

A method for determining a feature point from the contour of the golf player 24 of a predetermined position during a takeback will be described with reference to FIGS. 37 to 39. In FIG. 37, a dominant arm of the golf player 24 is in a horizontal state. The contour is obtained by silhouette extraction as in the contour of the address.

A method for determining a feature point of the base of the neck will be described with reference to FIG. 37. A point P201, a point P202, a point P203, a point P204, a point P205, and a straight line L201 are determined as in the point P101, the point P102, the point P103, the point P104, the point P105, and the straight line L101, and the descriptions thereof are omitted herein.

A point P206 is a center of gravity of a silhouette S1 portion located on the left side of the straight line 201. A straight line L202 is a straight line extending in a direction of a y-axis from the point P206. A point P207 is an intersection point between the straight line L202 and the contour, and is a reference point. The point P207 has a value of y smaller than that of the point P206. A straight line L203 is a straight line passing through the point P204 and the point P207. A point P208 is a point located on the contour between the point P204 and the point P207, wherein a distance between the straight line L203 and the point P208 is maximized. The point P208 shows the feature point of the base of the neck. In the takeback, it is hard to specify the feature point of the base of the neck as in the point P106 of the address. Herein, the point P208 is easily determined by using the point P207 as the reference point. The posture of the photographic subject is different for every check frame. Thus, the extreme value, the reference point, and the feature point which are suitable for the different posture are determined. Thereby, the quality of the swing can be easily and accurately decided.

A method for determining the backbone line will be described with reference to FIG. 38. A point P209 is the feature point of the front waist. The point P209 is determined as in the feature point P118 of the front waist, and the description thereof is omitted herein. A straight line L204 is a straight line passing through the point P205 and the point P209. A point P210 is a point on the straight line L204. When a distance between the point P205 and the point P209 is defined as D5, the point P210 is a point located at a distance of ½ times of D5 from the point P205. The point P210 shows the feature point of the waist. The point P210 is determined based on the geometrical position relation of the region of the human body. A chain double-dashed line 205 is a straight line passing through the point P208 and the point P210. The straight line L205 is the backbone line.

Figure 38:
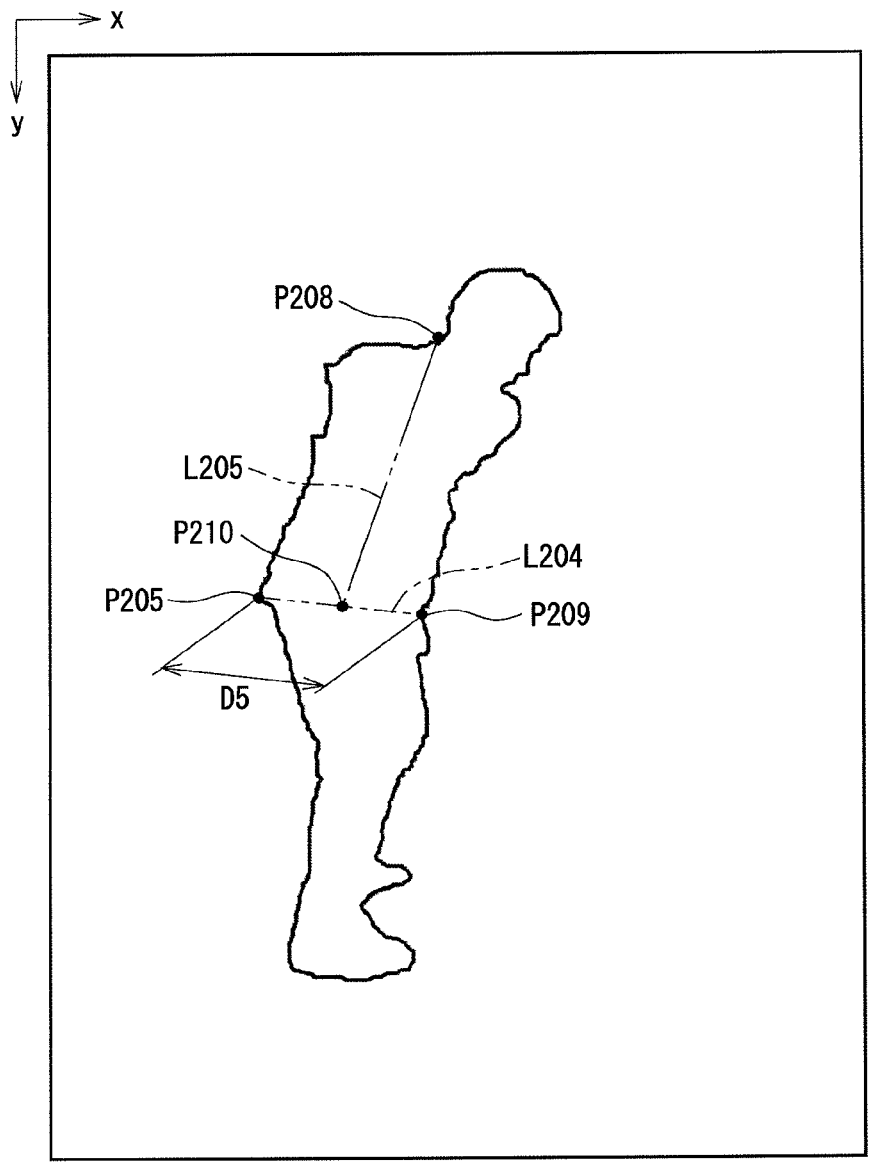
FIG. 38 is an illustration for determining another feature point from the contour of the predetermined position during the takeback.

Although the point P205 of FIG. 38 is determined as in the point P105, another feature point may be determined in place of the point P205. For example, a plurality of points on the contour including the point P205 are determined as the reference point. The contour is approximated to a polynomial expression with a least squares method. A point on an approximate line approximated to the polynomial expression and having minimum x may be the feature point. The point and the straight lines corresponding to the point P210, the straight line L204, and the straight line L205 may be specified by using the feature point in place of the point P205 which is the extreme value.

A method for determining a feature point of a left tiptoe will be described with reference to FIG. 39. A feature point P211 of the right tiptoe is determined as in the feature point P117 of the right tiptoe. The contour of the right tiptoe including the point P211 is prepared as the template. The template including the point P211 is matched with the contour. A portion of the contour with which the template is most matched is defined as the left tiptoe. When the matching is conducted, a point P212 is a point of a position corresponding to the point P211. The point P212 shows the feature point of the left tiptoe. Herein, the template is matched with the left tiptoe with the contour of the right tiptoe having a relative position specified from the feature point P211 as the template. A point of a position corresponding to the feature point P211 specified from the template of the right tiptoe is specified as the point P212. The feature point P117 of the right tiptoe of the address and the contour including the point P117 may be used as the template.

Figure 39:
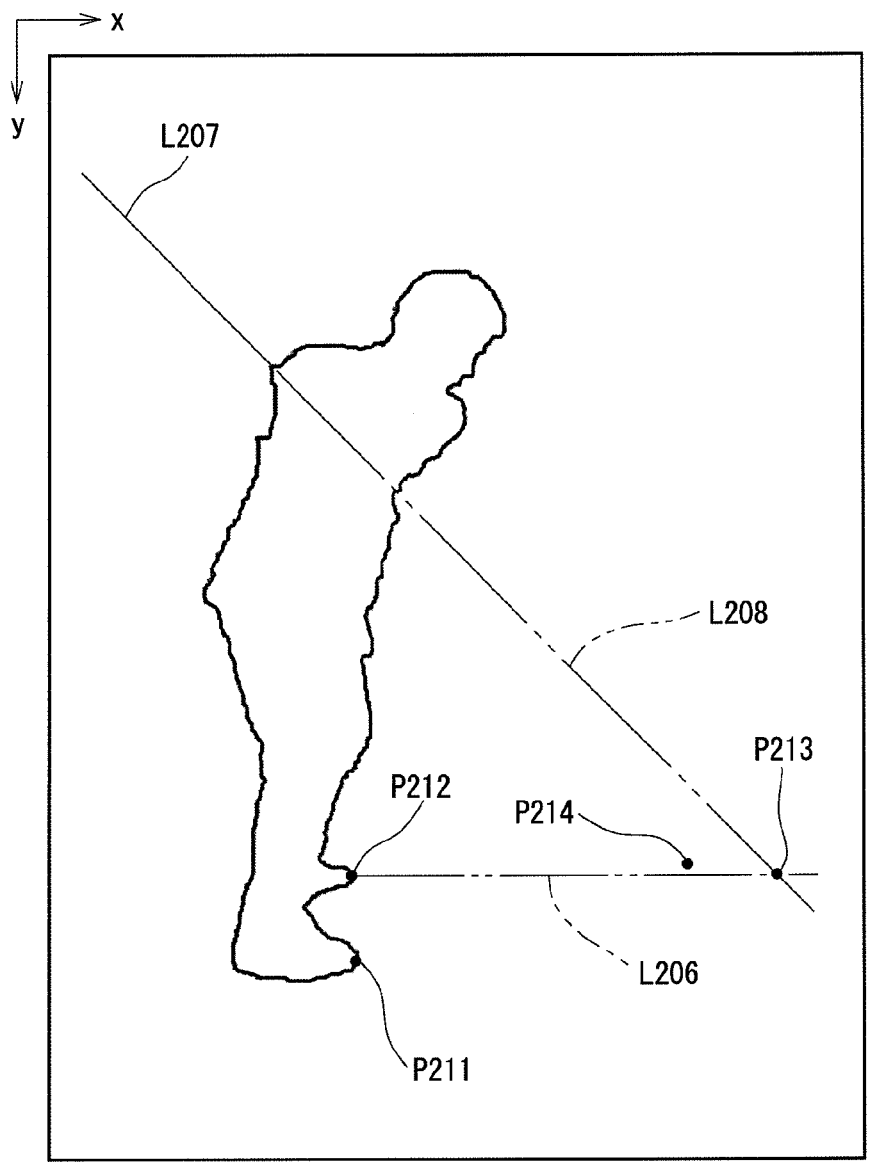
FIG. 39 is an illustration for determining still another feature point from the contour of the predetermined position during the takeback.

A straight line L206 of FIG. 39 is a straight line passing through the point P212. The straight line L206 extends in the direction of the x-axis. A straight line L207 shows a shaft line. The shaft line L207 is obtained by subjecting a frame of a predetermined position during a takeback and a frame of an address to difference processing. The shaft line L207 is obtained by Hough transforming after difference processing. FIG. 39 is obtained by stacking the shaft line L207 on a silhouette of FIG. 37. A chain double-dashed line L208 is an extension line of the shaft line L207. A point P213 is an intersection point between the straight line L206 and the straight line 208.

A point P214 of FIG. 39 shows a feature point of a center position of a ball before hitting. The silhouette of the ball before hitting is obtained by subjecting the frame before the impact and the frame after the impact to difference processing. The point P214 is obtained as the middle point of the direction of the x-axis and the direction of the y-axis in the silhouette of the ball, for example.

Figure 41:
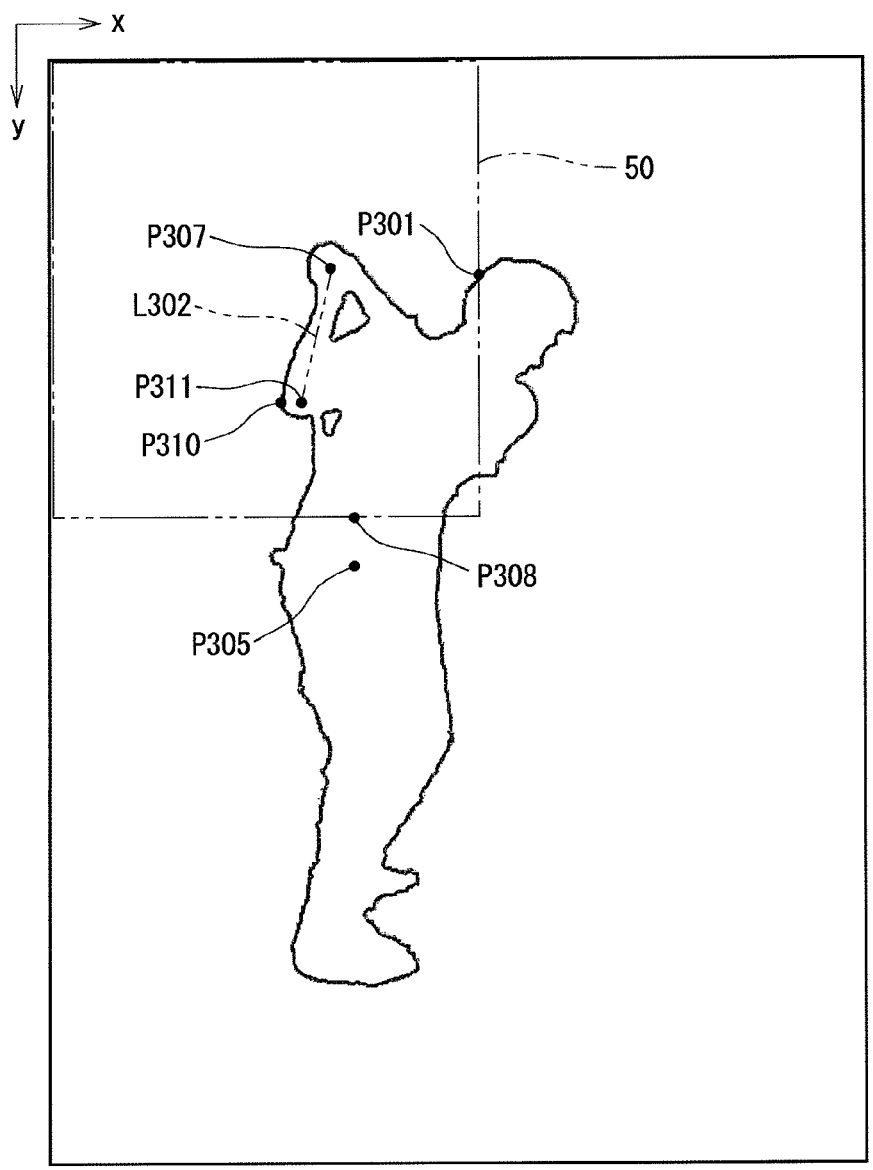
FIG. 41 is an illustration for determining another feature point from the contour of the top.
Figure 42:
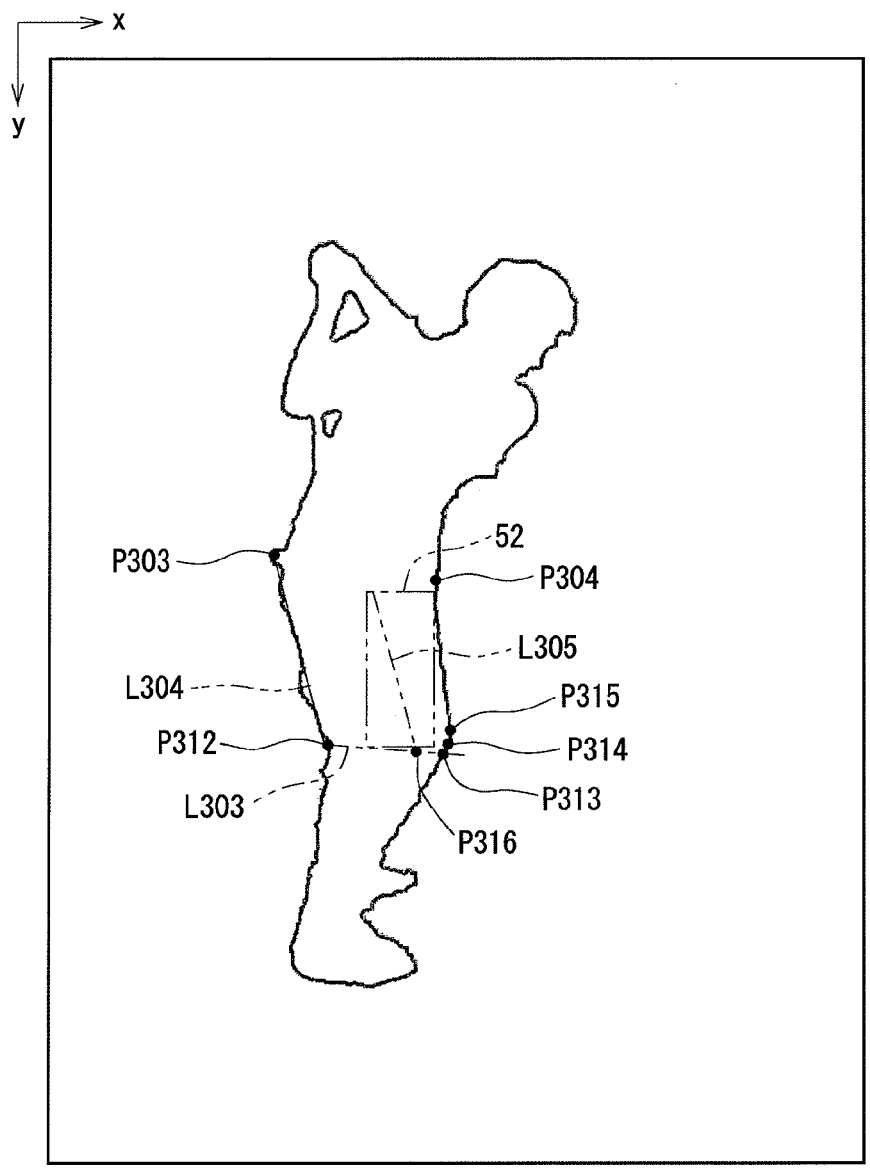
FIG. 42 is an illustration for determining still another feature point from the contour of the top.

A method for determining a feature point from the contour of the golf player 24 of the top will be described with reference to FIGS. 40 to 42. The contour is obtained by the silhouette extraction as in the contour of the address.

A method for determining a feature point of a wrist will be described with reference to FIG. 40. A point P301, a point P302, a point P303, a point P304, a point P305, a straight line L301, and a straight line L302 are respectively determined as in the point P204, the point P208, the point P205, the point P209, the point P210, the straight line L204, and the straight line L205, and the descriptions thereof are omitted herein. The contour of the head part including the point P204 and the point P208 may be prepared as the template, and the template may be matched. The contour of FIG. 40 may be matched with the template, and points corresponding to the point P204 and the point P208 may be respectively determined as the point P301 and the point P302.

Figure 40:
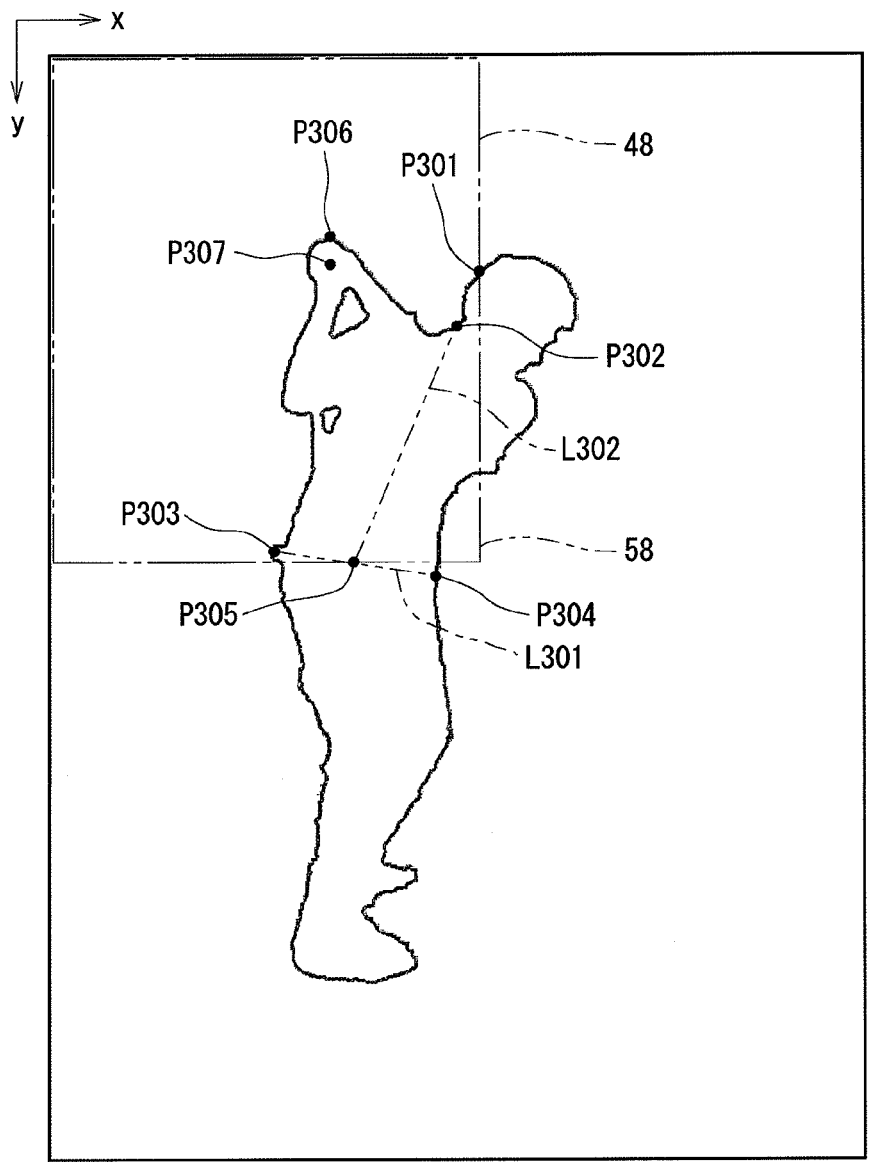
FIG. 40 is an illustration for determining a feature point from a contour of a top.

A wrist search area 48 of FIG. 40 is a predetermined range with the point P301 as a base point. The wrist search area 48 is a pixel range in which x is 0 or greater and $x_{301}$ or less and y is 0 or greater and $y_{305}$ or less. y of a point P306 is a minimum value in the wrist search area 48. The point P306 is a feature point of a hand. A point P307 is a point moved by a predetermined amount in the direction of the y-axis from the point P306. For example, a value $y_{307}$ of the y-coordinate of the point P307 is $y_{306}+10$. The point P307 is the feature point of the wrist. The point P307 is determined based on the geometrical position relation of the region of the human body.

A method for determining a feature point of a right elbow and a right arm line will be described with reference to FIG. 41. A point P308 is a point moved by a predetermined amount in the direction of the y-axis from the point P305. For example, a value $y_{308}$ of the y-coordinate of the point P308 is $y_{305}-50$. A right elbow search area 50 is a predetermined range with the point P301 as a base point. The right elbow search area 50 is a pixel range in which x is 0 or greater and $x_{301}$ or less and y is 0 or greater and $y_{308}$ or less. x of a point P310 is a minimum value in the right elbow search area 50. A point P311 is a point moved by a predetermined amount in the direction of the x-axis from the point P310. For example, a value $x_{311}$ of the x-coordinate of the point P311 is $x_{310}+10$. The point P311 is the feature point of the right elbow. The point P311 is determined based on the geometrical position relation of the region of the human body. The chain double-dashed line L302 is a straight line passing through the point P307 and the point P311. The straight line L302 is the right arm line.

A method for determining feature points of right and left knee points will be described with reference to FIG. 42. A point P312 is the feature point of a right posterior knee. The point P312 is determined as in the point P113 of the address. A chain double-dashed line L303 is a straight line extending in the direction of the x-axis from the point P312. A point P313 is an intersection point between the straight line L303 and the contour. x of a point P314 is a maximum value around the point P313. The point P314 is a temporary left knee point. The contour is approximated with the Bezier curve on the basis of the point P314. As in the feature point P113, the Bezier curve is approximated to the contour, and the feature point is determined. Thus, a point P315 is determined as the feature point of the left knee point.

Although not shown in the drawings, the contour of an area of the waist to the right posterior knee is linearly approximated by using the edge image of the frame of the top. For example, the contour is linearly approximated by using the least squares method. A chain double-dashed line L304 of FIG. 42 shows the approximated straight line. A knee contour search area 52 is a predetermined range with the point P303 as a base point. For example, the knee contour search area 52 is a pixel range in which x is $x_{304}-30$ or greater and $x_{304}$ or less and y is $y_{303}+35$ or greater and $y_{312}$ or less. In the edge image, a straight line almost parallel to the straight line L304 is searched in the knee contour search area 52. A straight line L305 shows a straight line parallel to the straight line L304 determined in the edge image. A point P316 is an intersection point between the straight line L305 and the straight line L303. The point P316 shows the feature point of the right knee point.

A width of a foot may be previously measured in place of determining the straight line L305. A parallel line may be drawn with respect to the straight line L304 with the clearance of the width of the foot on the knee point side. The intersection point between the parallel line and the straight line L303 may be the feature point of the right knee point.

Figure 43:
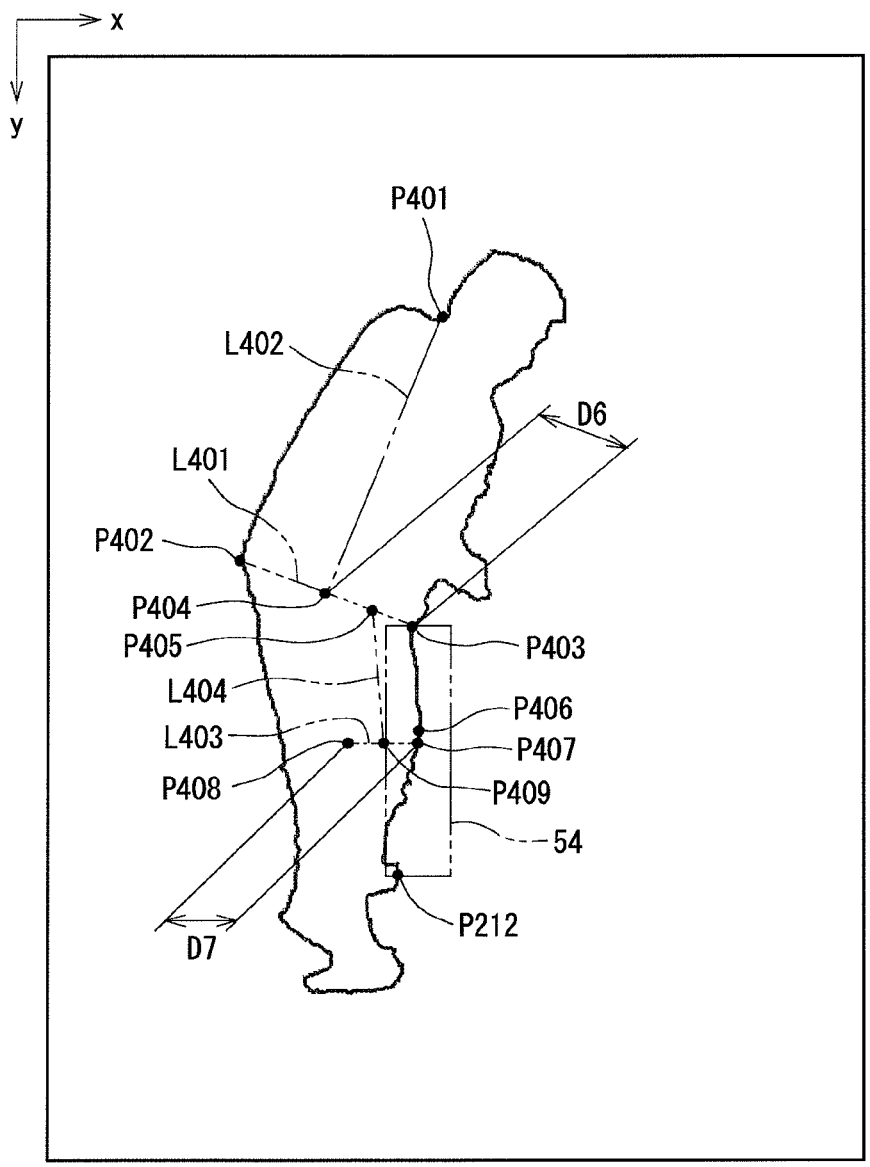
FIG. 43 is an illustration for determining a feature point from a contour of an impact.
Figure 44:
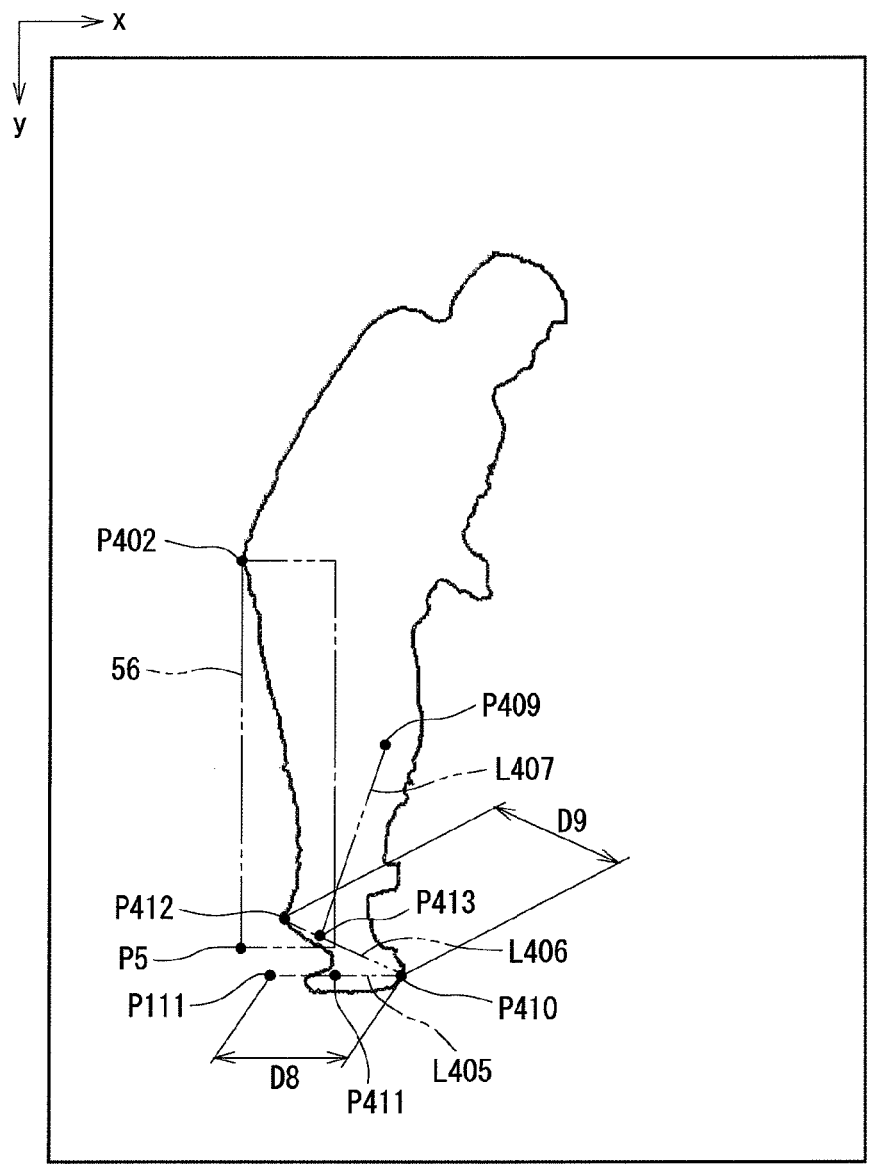
FIG. 44 is an illustration for determining another feature point from the contour of the impact.

The contour of the golf player 24 of the impact obtained from the check frame is shown in FIGS. 43 and 44. A method for determining a feature point from the contour of the golf player 24 will be described with reference to FIGS. 43 and 44. The contour is obtained by the silhouette extraction.

A point P401, a point P402, a point P403, a point P404, a straight line L401, and a straight line L402 of FIG. 43 are respectively determined as in the point P208, the point P205, the point P209, the point P210, the straight line L204, and the straight line L205, and the descriptions thereof are omitted herein. A point P405 is a point on the straight line L401. When a distance between the point P404 and the point P403 is defined as D6, the point P405 is a point located at a distance of ½ times of D6 from the point P404. The point P405 is determined from the geometrical position relation of the region of the human body. In the determination of the point P401, the contour of the head part including the point P208 may be prepared as the template, and the template may be matched. The contour of FIG. 40 may be matched with the template, to determine a point corresponding to the point P208 as the point P401.

A right knee point search area 54 of FIG. 43 is a predetermined range with the feature point P403 of a front waist as a base point. For example, the predetermined range is a pixel range in which x is $x_{403}-30$ or greater and $x_{404}+50$ or less and y is $y_{403}$ or greater and $y_{212}$ or less. A point P406 having x as a maximum value in the right knee point search area 54 is defined as a temporary knee point. The contour is approximated with the Bezier curve on the basis of the point P406. As in the feature point P113, the Bezier curve is approximated to the contour, and the feature point is determined. Thus, a point P407 is determined as the feature point of the right knee point.

Although not shown in the drawings, an edge is searched in a minus direction of the x-axis from the point P407 using the edge image of the frame of the impact. When the edge is in the area of the silhouette of the golf player 24, the position of the edge is defined as a point P408. The point P408 shows the feature point of the right posterior knee.

In the method for determining the point P408, the width of the foot may be previously measured. The feature point P408 of the right posterior knee may be determined with the clearance of the width of the foot from the point P407. The method may be used when the edge is not discovered in the area of the silhouette of the golf player 24.

A chain double-dashed line L403 is a straight line passing through the point P407 and the point P408. A point P409 is located on the straight line L403, and is located between the point P407 and the point P408. When a distance between the point P408 and the point P407 is defined as D7, the point P409 is a point located at a distance of ½ times of D7 from the point P408. The point P409 is the feature point of the right knee joint.

A chain double-dashed line L404 is a straight line passing through the point P405 and the point P409. The straight line L404 shows the right thigh line.

A method for determining a feature point of the right ankle and a lower thigh line will be described with reference to FIG. 44. The point P111 is the feature point of the heel determined in the address. A point P410 is the feature point of the tiptoe. The point P410 uses the feature point P117 of the tiptoe of the address. The point P410 may be determined from the contour of the impact. A chain double-dashed line L405 is a straight line passing through the point P111 and the point P410. A point P411 is a point on the straight line L405. The point P411 is located between the point P111 and the point P410. When a distance between the point P111 and the point P410 is defined as D8, the point P411 is a point located at a distance of ½ times of D8 from the point P111.

A heel search area 56 is a predetermined range with the point P402 as a base point. The predetermined range is a pixel range in which x is $x_{402}$ or greater and $x_{411}$ or less and y is $y_{402}$ or greater and $y_{111}-10$ or less, for example. A point P412 is a point on the contour, wherein a distance between a point P5 located at the lower left corner of the heel search area 56 and the point 412 is minimized in the heel search area 56. The point P412 shows the feature point of the heel. A chain double-dashed line L406 is a straight line passing through the point P412 and the point P410. A point P413 is a point on the straight line L406. The point P413 is located between the point P412 and the point P410. When a distance between the point P412 and the point P410 is defined as D9, the point P413 is a point located at a distance of 3/10 times of D9 from the point P412. The point P413 shows the feature point of the right ankle. A chain double-dashed line L407 is a straight line passing through the point P413 and the point P409. The straight line L407 shows the lower thigh line.

The calculating part 16 decides the quality of the posture of the golf player 24 based on these feature points and the lines determined from the feature points. The posture of the golf player and the quality of the swing are decided based on the positions of the feature points of the plurality of different check frames and the positions of the lines determined from the feature points (STEP83).

Figure 45:
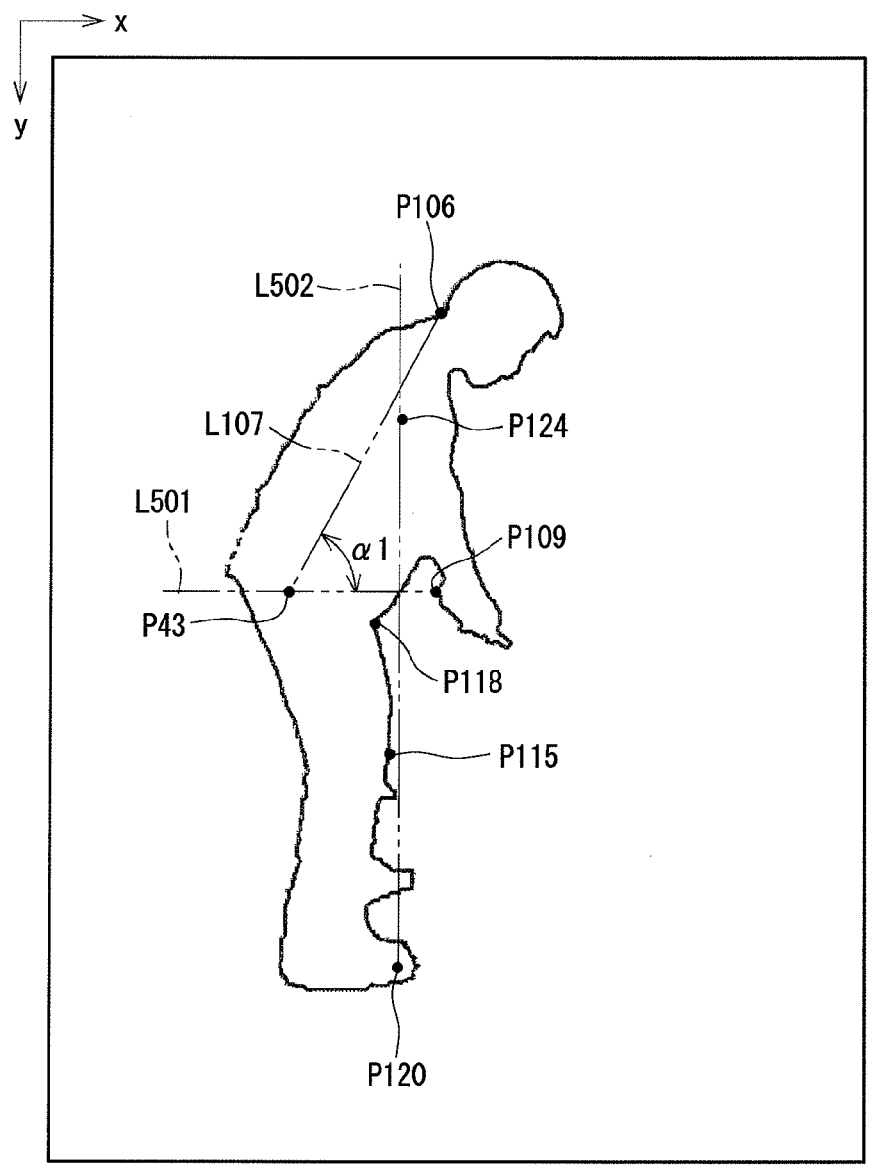
FIG. 45 is an illustration for deciding a swing from a contour of an address.

A method for deciding the quality of the address will be described as an example with reference to FIG. 45. A chain double-dashed line L502 of FIG. 45 is a balance point line. A double-pointed arrow a1 is an inclination of a backbone line L107 with respect to the horizontal direction. The balance point line L502 is a straight line passing through the feature point P120 of the thenar and extending in a vertical direction.

For example, the calculating part 16 acquires the position information of the feature point. The following judging indices E1 to E4 are calculated in the address from the position information.

$E1 = x_{124} - x_{120}$ $E2 = x_{115} - x_{120}$ $E3 = \alpha 1$ $E4 = x_{109} - x_{118}$ When the judging index E1 is in a predetermined range, the calculating part 16 judges that the position of the right shoulder is close to the balance point line L502. The calculating part 16 judges that the position of the right shoulder is excellent. When the judging index E1 is out of the predetermined range, the calculating part 16 judges that the balance is poor. In the address in which the balance is poor, shot is apt to be unstable. The predetermined range is −10 or greater and +10 or less, for example.

Similarly, when the judging index E2 is in a predetermined range, the calculating part 16 judges that the position of the knee is close to the balance point line L502. The calculating part 16 judges that the position of the knee is excellent. When the judging index E2 is out of the predetermined range, the calculating part 16 judges that the balance is poor. In the address in which the balance is poor, shot is apt to be unstable. The predetermined range is −10 or greater and +10 or less, for example.

The judging index E3 is a spine angle. When the judging index E3 is in a predetermined range, the calculating part 16 judges that the spine angle is excellent. When the judging index E3 is smaller than the predetermined range, the golf player 24 is hard to use the power of the lower body. The loss of a flight distance is increased. When the judging index E3 is larger than the predetermined range, a rotation axis is unstable. Shot is apt to be unstable. The predetermined range of the judging index E3 is 50 degrees or greater and 70 degrees or less, for example.

When the judging index E4 is in a predetermined range, the calculating part 16 judges the position of the grip is excellent. When the judging index E4 is smaller than the predetermined range, the golf player 24 is hard to swing arms. The loss of the flight distance is increased. When the judging index E4 is greater than the predetermined range, the golf player 24 is hard to maintain the movement balance of the body and the arms. The predetermined range is 5 or greater and 20 or less, for example.

Herein, the address is described as an example. However, each posture can be judged also in the check frames of the predetermined position during the takeback, the top, the quick turn, the impact, and the finish. The quality of the swing is evaluated by comparing the judging indices of the check frames. For example, it can be judged whether the rotation axis is stable by comparing a spine angle $\alpha 1$ of the address with the spine angle at the predetermined position during the takeback. The calculating part 16 decides the quality of the swing in each check frame based on the predetermined judging indices. The calculating part 16 compares the judging indices obtained from the two or more different check frames to decide the quality of the swing. When the judgement of all the judging indices is completed, the decision of the quality of the swing is completed (STEP8).

In the diagnosing method, a plurality of check frames are determined from the image data (STEP6). The swing diagnosis in various postures is conducted. The quality of the change of the posture is diagnosed between the different postures. The diagnosing method can be used for the synthetic diagnosis of the swing.

In the diagnosing method, a point on the contour which is the extreme value is determined. The base of the neck, the knee joint, the backbone line, the thigh line, the ankle, and the waist or the like are determined as the feature point from the extreme value. The extreme value on the contour is easily determined, and incorrect determination can be suppressed. Since the feature point is determined based on the extreme value, the feature point is easily determined, and the incorrect determination is suppressed. The judging method enables accurate decision. The judging method can shorten a processing time for the decision.

Furthermore, these feature points, the shaft line of the golf club, and the ball position are specified, and thereby the quality of the swing of the golf player can be accurately decided.

In the embodiment, the contour is determined from the binary image by the silhouette extraction. However, the contour may be determined by another method. For example, the contour may be determined by subjecting the plurality of frames to difference processing. The feature point may be determined for the contour as described above.

Figure 46:
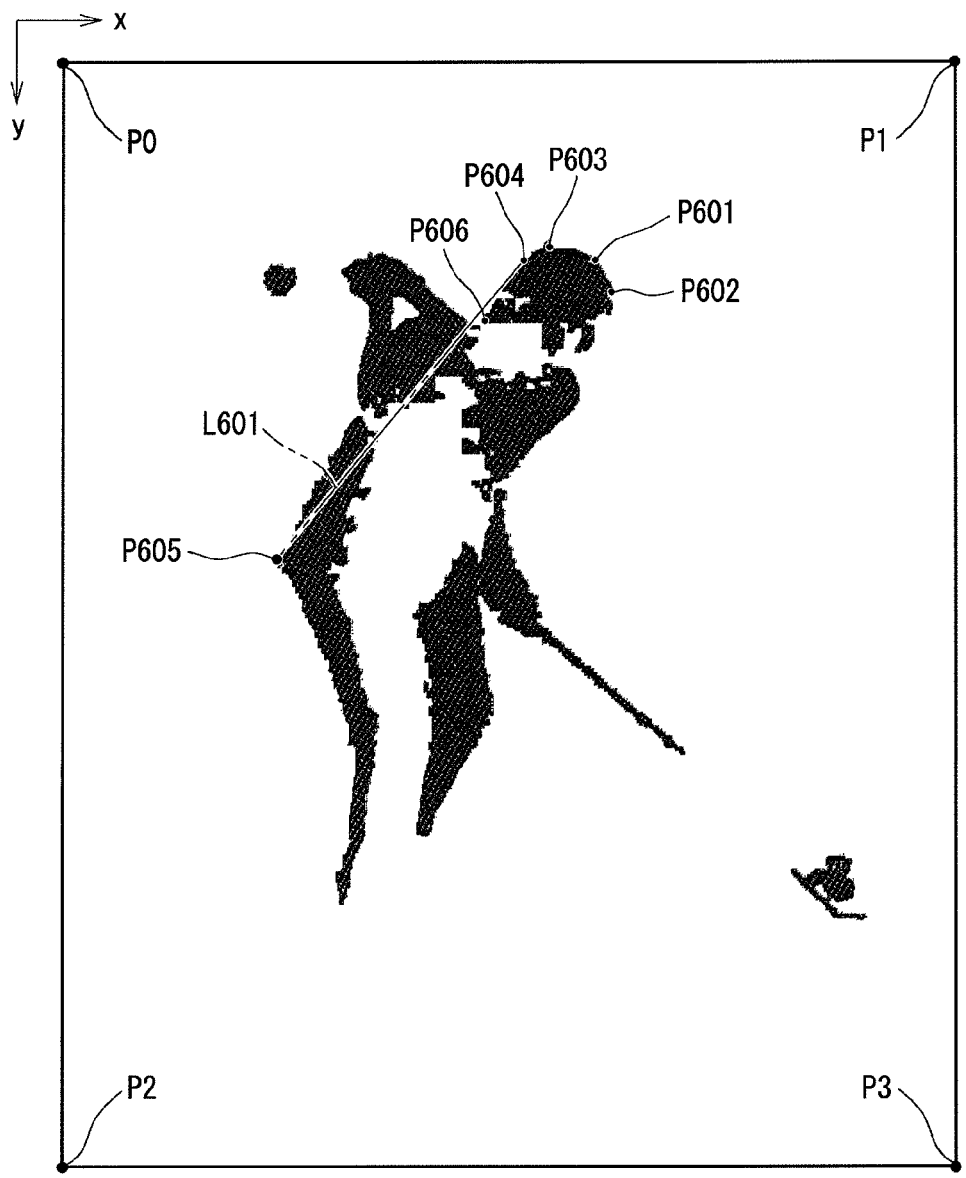
FIG. 46 is an illustration for determining a feature point from an image subjected to difference processing.

A diagnosing method according to another embodiment of the present invention will be described with reference to FIG. 46. In the embodiment, a difference image obtained by difference processing is used. A difference image obtained by subjecting an address and a top to difference processing is shown in FIG. 46. The difference image is subjected to camera shake correction.

The difference image is first subjected to contraction processing to remove dot noise or the like. Preferably, the contraction processing is conducted a plurality of times. For example, the contraction processing is conducted three times. Next, labeling processing is conducted. In the labeling processing, a region having an area having a predetermined number or greater of pixels is left, and a region having an area having a predetermined number or less of pixels is removed. For example, the predetermined number of pixels in the labeling processing is 150. Next, expansion processing is conducted. The size of the image is returned to a state before the contraction processing by the expansion processing. Preferably, the expansion processing is conducted a plurality of times. For example, the expansion processing is conducted four times.

Herein, the contraction processing, the labeling processing, and the expansion processing are conducted after the difference processing. Thereby, the contour of the golf player 24 can be more accurately and easily identified. The feature point can be easily determined based on the contour.

An example of a method for determining a feature point in the address will be described with reference to FIG. 46. The image includes pixels of 480×640. In FIG. 46, a frame is expressed as x-y-coordinates including each pixel as one unit with an upper left point P0 (0, 0) as an original point. An upper right end is a point P1 (479, 0); a lower left end is a point P2 (0, 639), and a lower right end is a point P3 (479, 639).

Although not shown in the drawings, a head part search area and a back head part search area are provided as in the embodiment. A point P601, a point P602, a point P603, a point P604, a point 2605, and a straight line L601 of FIG. 46 are determined as in the point P101, the point P102, the point P103, the point P104, the point P105, and the straight line L101 of FIG. 30. Herein, the descriptions thereof are omitted.

Herein, there is shown the method for subjecting the address and the top to the difference processing to determine the extreme value of the head part of the address and the extreme value of the posterior waist. The combination of the frames subjected to the difference processing is replaced in the plurality of frames, and another extreme value is determined by using the difference image. The feature point can be determined from the extreme value. The feature point in another posture can be determined.

Although the calculating part 16 of the server 6 conducts each of processings in the embodiment, the calculating part 16 of the mobile telephone 4 may conduct each of the processings. In the case, the connection of the mobile telephone 4 and the server 6 is unnecessary.

The method according to the present invention can diagnose the swing performed in a golf course, a practice range, a golf shop, and a garden of a general household or the like.

What is claimed is:

1. A diagnosing method of a golf swing comprising the steps of:

a camera photographing a golf player swinging a golf club to hit a golf ball and the golf club to obtain image data;

determining, by a processor, a check frame in which the golf player is in a predetermined posture from a plurality of frames obtained from the image data;

determining, by the processor, a contour of the golf player from the check frame;

deciding, by the processor, the swing from the contour of the golf player, and determining extreme values constituting the contour, the extreme values being maximum values or minimum values of a predetermined function;

determining at least one reference point from the extreme values;

determining a plurality of feature points from the extreme values, each of said plurality of feature points being a point on the contour and expressing a region of the photographed golf player, wherein each of the plurality of feature points is determined such that a distance between the point on the contour and a straight line that passes the reference point and another point on the contour with extreme values, which is not designated as the at least one reference point, is maximized or minimized;

calculating judging indices from a difference between coordinates of two feature points; and diagnosing the swing using position information of the plurality of feature points, wherein quality of swing is diagnosed based on whether the judging indices are in a predetermined range or not.

2. The diagnosing method according to claim 1, wherein the extreme values constitute a contour of a head part, a contour of a waist, or a contour of a heel.

3. The diagnosing method according to claim 1, further comprising the steps of:

determining a point on the contour to be a reference point based on the extreme value;

subjecting the contour including the reference point to polynomial approximation to obtain an approximate line; and determining a point on the approximate line, by the same determination as the extreme values that is maximum value or a minimum value of a predetermined function, to be another feature point.

4. The diagnosing method according to claim 1, further comprising the steps of:

defining a part of the contour of which a relative position from the feature point is specified as a template;

matching the template with another region of the contour; and when the template is most approximated to another region of the contour, defining a point of a position corresponding to the feature point specified from the template as another feature point.

5. The diagnosing method according to claim 1, further comprising the step of determining a point on a straight line extended from the feature point and having a maximum edge to be another feature point.

6. The diagnosing method according to claim 1, wherein a point determined based on a geometrical position relation of a region of a human body from the extreme values, a reference point obtained from the extreme values, or the feature point is defined as another feature point.

7. The diagnosing method according to claim 6, wherein the geometrical position relation of the region of the human body is a position relation in the check frame in which the golf player is in the predetermined posture.

8. The diagnosing method according to claim 1, further comprising the steps of:

setting a predetermined search area on the basis of the extreme values, a reference point obtained from the extreme value, or the feature point; and defining a point from the extreme values which are within the search area as another feature point.

9. The diagnosing method according to claim 8, wherein the predetermined search area is set based on a geometrical position relation between the extreme values, the reference point, or the feature point and the region of the human body.

10. The diagnosing method according to claim 9, wherein the geometrical position relation of the region of the human body is a position relation in the check frame in which the golf player is in the predetermined posture.

11. The diagnosing method according to claim 1, wherein a binary image of a silhouette of the golf player is obtained from the check frame in the step of determining the contour of the golf player from the check frame; and the contour of the golf player is determined from the binary image.

12. The diagnosing method according to claim 1, wherein a difference image is obtained by subjecting the plurality of frames to difference processing in the step of determining the contour of the golf player from the check frame; and the contour of the golf player is determined from the difference image.

13. The diagnosing method according to claim 1, further comprising the step of conducting camera shake correction, wherein the plurality of frames obtained from the image data are subjected to the camera shake correction.

14. The diagnosing method according to claim 13, wherein the image data is subjected to the camera shake correction in the step of conducting the camera shake correction.

15. A diagnosing system of a golf swing comprising:

(A) a camera photographing a golf player swinging a golf club to hit a golf ball and the golf club;

(B) a memory storing photographed image data; and (C) a calculating part, wherein the calculating part comprising:

(C1) a function for extract a plurality of frames from the image data;

(C2) a function for determining a check frame in which the golf player is in a predetermined posture from the plurality of frames;

(C3) a function for determining a contour of the golf player of the check frame;

(C4) a function for determining extreme values from the contour, the extreme values being maximum values or minimum values of a predetermined function;

(C5) a function of determining at least one reference point from the extreme values;

(C6) a function for determining a plurality of feature points from the extreme values, each of said plurality of feature points being a point on the contour and expressing a region of the photographed golf player, wherein each of the plurality of feature points is determined such that a distance between the point on the contour and a straight line that passes the reference point and another point on the contour with extreme values, which is not designated as the at least one reference point, is maximized or minimized;

(C7) calculating judging indices from a difference between coordinates of two feature points; and (C8) a function for diagnosing the swing using position information of the plurality of feature points, wherein quality of swing is diagnosed based on whether the judging indices are in a predetermined range or not.

16. The diagnosing system of the golf swing according to claim 15, wherein the calculating part has a function for subjecting the image data to camera shake correction.

* * * * *